(12) United States Patent
Bourissou et al.

(10) Patent No.: US 7,528,211 B2
(45) Date of Patent: May 5, 2009

(54) METHOD FOR CONTROLLED POLYMERIZATION OF O-CARBOXY ANHYDRIDES DERIVED FROM α-HYDROXY ACIDS

(75) Inventors: Didier Bourissou, Plaisance du Touch (FR); Olivier Thillaye Du Boullay, Montans (FR); Emmanuel Marchal, Albi (FR); Bianca Martin-Vaca, Toulouse (FR)

(73) Assignees: Isochem, Paris (FR); Centre de la Recherche Scientifique (CNRS), Paris (FR); Universite Paul Sabatier Toulouse III, Toulouse (FR)

( * ) Notice: Subject to any disclaimer, the term of this patent is extended or adjusted under 35 U.S.C. 154(b) by 54 days.

(21) Appl. No.: 11/783,258

(22) Filed: Apr. 6, 2007

(65) Prior Publication Data
US 2007/0249654 A1    Oct. 25, 2007

Related U.S. Application Data

(63) Continuation-in-part of application No. PCT/EP2005/055103, filed on Oct. 7, 2005.

(30) Foreign Application Priority Data
Oct. 8, 2004    (FR)    .................... 04 10639

(51) Int. Cl.
*C08G 63/00*    (2006.01)
*C08G 63/02*    (2006.01)

(52) U.S. Cl. ................ 528/183; 435/135; 525/437; 525/451; 526/266; 526/270; 528/271; 528/272

(58) Field of Classification Search ............ 435/135; 525/437, 451; 526/266, 270; 528/271, 272
See application file for complete search history.

(56) References Cited

U.S. PATENT DOCUMENTS 3,641,021 A    2/1972    Ryan
5,292,859 A    3/1994    Ford et al.

FOREIGN PATENT DOCUMENTS

FR    2838964 A1    10/2003
WO    WO 03/090727 A1    11/2003

OTHER PUBLICATIONS

Kricheldorf et al. New Polymer Syntheses Polymer Bulletin 9, 276,283 (1983).*
Davies, W.H., "Anhydrocarboxy-derivatives of Hydroxy- and Mercapto-acids," J. Chem. Soc., 1951, 1357-1359.
Kowalski et al., "Polymerization of L,L-Dilactide Initiated by Tin(II) Butoxide," Macromolecules, 2000, 33:1964-1971.
Kricheldorf et al., "New Polymer Syntheses," Polymer Bulletin, 1983, 9:276-283.
Smith et al., "Studies in Ring Opening Polymerization, 6a) Tertiary Base Initiated Polymerisation of 5-Phenyl-1,3-dioxolan-2,4-dione," Makromol. Chem., 1981, 182:313-324.
Thillaye Du Boullay et al., "An activated equivalent of lactide toward organocatalytic ring-opening polymerization," J. Am. Chem. Soc., 2006, 128:16442-16443.
Vert, Michel, "La chimie pour adapter les dispositifs therapeutiques polymers a l'organisme humain," MoIL'Actualite Chimique, Nov.-Dec. 20-25, 2003.

* cited by examiner

*Primary Examiner*—Terressa M Boykin
(74) *Attorney, Agent, or Firm*—Foley and Lardner LLP

(57) ABSTRACT

The invention concerns a method for preparing poly(-hydroxy acids), the polymerization reaction being performed in controlled manner in the presence of a catalytic system including a base, said base being a 5- or 6-membered aromatic heterocycle comprising at least one endocyclic nitrogen atom, provided that when the base is used alone in the catalytic system, it does not represent pyridine, 2-methylpyridine, 2,6-dimethylpyridine or 2-methoxypyridine. The invention also concerns poly(-hydroxy acids) of formula (IV). Finally, the invention concerns the use of a poly(-hydroxy acid), obtainable by the inventive method, for vectoring active principles or for making biomaterials.

31 Claims, 1 Drawing Sheet

METHOD FOR CONTROLLED POLYMERIZATION OF O-CARBOXY ANHYDRIDES DERIVED FROM α-HYDROXY ACIDS

The present invention relates to a method for controlled polymerization of 1,3-dioxolane-2,4-diones, also called O-Carboxy Anhydrides (OCAs), and to new OCAs with at least one salifiable side chain.

Poly(α-hydroxy acids) are biodegradable and biocompatible polyesters, particularly of interest for surgery and vectoring drugs. In particular, they may form biomaterials, for example useful as a raw material for making prostheses, implants or even for application as carriers enabling the release of active ingredients. Applying the poly(α-hydroxy acids) as resorbable suture yarns, temporary skin substitutes or textile fibers is also possible.

In the field of biodegradable polymers for the biomedical field, whether for surgery (suture yarns, orthopedic surgery, etc.) or vectoring active ingredients, the difficulty is related to controlling the required properties for a given application.

For designing systems for in vivo addressing of active molecules or more specifically, systems for controlled transport and delivery of drugs at the aimed therapeutic targets, materials need to be elaborated, the dimensions, the physical and chemical structure of which enable both the crossing of different physiological barriers, the search for the target and its recognition and then its treatment or its destruction. By copolymerizing biocompatible monomers, including stereocopolymerization (copolymerization of enantiomeric entities) and chemically changing them, the properties of a macromolecular substance may be adapted. (Vert, M.; *L'actualité Chimique,* November-December 2003, pages 20-25).

Hitherto, the most used poly(α-hydroxy acids) are poly (glycolic acid) (PGA) and poly(L-lactic acid) (PLA), which not only are biodegradable polymers, i.e., cleavable, under the effect of biochemistry of living systems, but are also bioassimilable because of the very nature of the released α-hydroxy acids.

PGAs and PLAs may be prepared by polymerizing cyclic diesters of glycolic acid (glycolide) or of L-lactic acid (L-lactide) or by polycondensation of hydroxy acids. In order to obtain diblock or triblock copolymers, the most utilized route seems to be copolymerization with ring opening of the glycolide and lactides (L and D-lactides) in the presence of tin 2-ethyl hexanoate (Kowalski, A.; Libiszowski, J.; Duda, A.; Penczek, S.; *Macromolecules,* 2000, 33, 1964).

Polymerization or copolymerization with opening of heterocycles of the α-hydroxy acid diester type is limited to glycolic and lactic acids, in practice, which of course limits the possibilities of adaptation to the required properties and imposes delicate copolymerizations with other cyclic monomers such as N-carboxy anhydrides derived from amino-acids (FR 2 838 964).

If copolymerization and stereo-copolymerization of PGAs and PLAs open the path to many degradable macromolecular compounds, these polymers are generally not functionalized. Now, today, diversification of the properties and the need for meeting increasingly demanding and definite technical specifications require the synthesis of functionalized polymers in order to cover a wider range of therapeutical applications, notably in pharmacology.

1,3-dioxolane-2,4-diones, commonly designated as O-Carboxy Anhydrides (abbreviated as OCAs), are heterocycles with 5 apices, highly studied in the literature because of their many potential applications. For example, they are used for chemically changing side chains of antibiotics (Lilly, Eli & Co; U.S. Pat. No. 3,641,021). Their preparation by phosgenation of corresponding α-hydroxy acids has been known for a long time, notably through the work of W. H. Davies (*J. Chem. Soc.,* 1951, 1357-1359).

All the polymerization tests performed on OCAs, in particular on 5-methyl-1,3-dioxolane-2,4-dione (derived from lactic acid), have randomly led to oligomers (molar weights $M_n$ less than 3,000 g/mol) as well shown through the work of H. R. Kricheldorg, and J. M. Jonté (*Polym. Bulletin,* 1983, 92 276-281). In spite of several tested basic catalysts (pyridine, triethylamine, potassium t-butylate, tetrabutyl titanate), the aforementioned authors only synthesize polymers with a molar weight less than 3,000 g/mol.

The publication by Smith, J.; Tighe, J.; *Makromol. Chem.* 1981, 182, 313, describes the polymerization of 5-phenyl-1, 3-dioxolane-2,4-dione in the presence of a pyridine or a substituted pyridine. The described method leads to the formation of a polymer with a number average molar weight between 2,100 and 3,940 g/mol; the polydispersity index being between 1.2 and 1.3. In view of their results, the authors of this publication have noticed that the molar weight of the obtained polymer is independent of the initial pyridine concentration.

Depending on the desired application of poly(α-hydroxy acids), it is desirable to be able to control the molar weight of the synthesized polymer. Thus, for biomedical applications as carriers allowing the release of active ingredients, it is preferable to be able to adapt the molar weight of the polymer to the contemplated type of therapeutical application; for example, weights from 500 to 5,000 for injectable preparations, weights from 50,000 to 100,000 for patches. For biomedical applications as resorbable suture yarns or temporary coetaneous substitutes, it is preferable that the polymers have a molar weight larger than 15,000 g/mol.

As a result, one of the goals of the invention is to provide a method for synthesizing poly(α-hydroxy acids) from OCAs, with which finished products with a controllable number molar weight, $M_n$, may be obtained.

The inventors have discovered a novel catalytic system with which α-hydroxy acid polyesters may be prepared by controlled polymerization of OCAs. The invention provides a more general technical alternative to the standard method for making these polymers with ring opening of cyclic diesters with six apices.

The object of the invention is a method for preparing poly (α-hydroxy acids) comprising the following successive steps:
i) Polymerization of OCA monomers of formula (I),

wherein $R_1$ and $R_2$ either identical or different, represent independently of each other, a radical selected from the group formed by
  hydrogen,
  saturated or unsaturated, linear or branched $C_1$-$C_{12}$ alkyl radicals,
  $C_7$-$C_{20}$ aralkyl radicals,
  simple or fused $C_3$-$C_{14}$ cycloalkyl radicals,
  simple or fused $C_2$-$C_{14}$ heterocycloalkyl radicals, simple or fused $C_6$-$C_{14}$ aromatic radicals, and
simple or fused $C_3$-$C_{14}$ heteroaromatic radicals, the whole of said radicals being optionally substituted with one or more radicals, if need be, protected, selected from the group formed by halogens, —$NO_2$,—OH, —$NH_2$,—SH, —COOH, —NH—$NH_2$,and —NH—C(NH)—$NH_2$; or $R_1$ and $R_2$ forming together a simple or fused, $C_4$-$C_{14}$ or $C_3$-$C_{14}$ cycle or heterocycle, respectively, optionally substituted with one or more radicals, if need be, protected, selected from the group formed by halogens, —$NO_2$,—OH, —$NH_2$, —SH, —COOH, —NH—$NH_2$ and —NH—C(NH)—$NH_2$;

in an organic advantageously anhydrous solvent, at a temperature between −20 and 200° C., advantageously between 0 and 100° C., even more advantageously between 20 and 50° C.; and then ii) if need be, purification of the polymer obtained following step i), and iii) recovering the polymer obtained following step i) or ii), characterized in that the polymerization reaction of step i) is performed in a controlled manner in the presence of a catalytic system comprising a base, said base being a 5- or 6-membered aromatic heterocycle comprising at least one endocyclic nitrogen atom, provided that the base is used alone in the catalytic system, it does not represent pyridine, 2-methylpyridine, 2,6-dimethylpyridine, or 2-methoxypyridine.

The polymerization reaction may be written as:

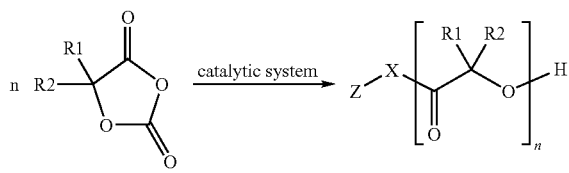

wherein the meaning of the radical Z depends on the catalytic system used and X represents a heteroatom selected from the group formed by O, S and N.

The radicals $R_1$ and $R_2$ advantageously represent independently of each other, a radical selected from the group formed by hydrogen, saturated or unsaturated, linear or branched $C_1$-$C_6$ alkyl radicals, 5- or 6-membered (hetero)cycloalkyl radicals and 5- or 6-membered (hetero)aromatic radicals, said radicals being possibly substituted by one or more radicals, if need be, protected, selected from the group formed by halogens, —$NO_2$,—OH, —$NH_2$,—SH, —COOH, —NH—$NH_2$, and —NH—C(NH)—$NH_2$;

The radicals $R_1$ and $R_2$ even more advantageously represent independently of each other, a radical selected from the group formed by hydrogen, methyl and phenyl.

According to an advantageous alternative of the invention, $R_1$ represents the $CF_3$ radical and $R_2$ represents the methyl radical.

In a particular embodiment of the invention, at least one radical $R_1$ ou $R_2$ represents a salifiable side chain.

In particular, $R_1$ represents a radical $(B)_u$-A-$(CH_2)$t wherein t is an integer between 1 and 10, advantageously between 1 and 6, in an advantageous way between 1 and 4, in a more advantageous way between 2 and 4;

A represents a heteroatom selected from O, N and S or a —COO or —NH radical,

B represents a A-protective group;

u is 1 or 2

$R_2$ represents a radical selected from the group formed by hydrogen,
$(CH_2)_t$-A-$(B)$u wherein t, u, A and B are as defined earlier,
saturated or unsaturated, linear or branched $C_1$-$C_{12}$ alkyls,
$C_7$-$C_{20}$ aralkyls,
simple or fused $C_3$-$C_{14}$ cycloalkyls,
simple or fused $C_2$-$C_{14}$ heterocycloalkyls,
aromatic, simple or fused, $C_6$-$C_{14}$ radicals, and
heteroaromatic, simple or fused $C_3$-$C_{14}$ radicals According to this embodiment, $R_2$ advantageously represents a radical selected from the group formed by hydrogen, saturated or unsaturated, linear or branched $C_1$-$C_6$ alkyls, 5 or 6-membered (hetero)cycloalkyls and 5 or 6-membered heteroaromatic radicals. $R_2$ more advantageously represents a hydrogen atom.

In the sense of the present invention, an <<A-protective group>>, means a group protecting the AH function against undesirable reactions during polymerization of the OCAs.

The term <<protective group>> or <<protecting group>> means the group which selectively blocks a reactive site (here site A) in a multi-functional compound so that a chemical reaction may be selectively carried out at another unprotected reactive site with the meaning conventionally associated with the latter in synthesis chemistry.

If A represents an oxygen atom or a —COO group, the A-protective group is an O-protective group. In this case, u is 1.

The term "O-protective group" means in the sense of the present invention any substituent which protects the hydroxyl or carboxyl group, i.e., a reactive oxygen atom against undesirable reactions during the polymerization of OCAs such as the O-protective groups described in Greene, "Protective Groups In Organic synthesis", (John Wiley & Sons, New York (1981)) et Harrison et al. <<Compendium of Synthetic Organic Methods", Vols. 1 to 8 (J. Wiley & sons, 1971 to 1996). The O-protective groups comprise methyl or alkyl ethers or esters, either substituted or not, for example methoxymethyl, benzyloxymethyl, 2-methoxyethoxymethyl, 2-trimethylsily)ethoxymethyl, t-butyl, benzyl and triphenylmethyl, benzyl ethers (either substituted or not), tetrahydropyranyl ethers, allyl ethers, substituted ethyl ethers, for example 2,2,2-trichloroethyl ether, silyl ethers or alkylsilyl ethers for example trimethylsilyl, t-butyldimethylsilyl, and t-butyldiphenylsilyl ethers, heterocyclic ethers; and esters prepared by reaction of the hydroxyl group with a carboxylic acid for example, tert-butyl, benzyl, or methyl esters, carbonates in particular benzyl or haloalkyl carbonate, acetate, propionate, benzoate, and the like. Advantageously this is a benzyl group.

If A represents NH or the heteroatom N, the A-protective group is an N-protective group. In this case, u is 1 or 2.

The term "N-protective group" means in the sense of the present invention, any substituent which protects the $NH_2$ group against undesirable reactions during polymerization of the OCAs such as the N-protective groups described in Greene, "Protective Groups In Organic synthesis", (John Wiley & Sons, New York (1981)) and Harrison et al. <<Compendium of Synthetic Organic Methods", Vols. 1 to 8 (J. Wiley & Sons, 1971 to 1996). N-protective groups comprise carbamates, amides, N-alkyl derivatives, amino acetal derivatives, N-benzyl derivatives, imine derivatives, enamine derivatives and N-heteroatom derivatives. In particular, the N-protective group comprises formyl, acetyl, benzoyl, pivaloyl, phenylsulfonyl, benzyl (Bn), t-butyloxycarbonyl (BOC), benzyloxycarbonyl (Cbz), p-methoxy-benzyloxycarbonyl, p-nitrobenzyl-oxycarbonyl, trichloroethoxycarbonyl (TROC), allyloxycarbonyl (Alloc), 9-fluorenylmethyloxycarbonyl (Fmoc), trifluoro-acetyl, benzyl carbamates (either substituted or not) and the like. It is advantageous to use either BOC or Cbz as an N-protective group because of the relative facility of removing it, for example with moderate acids, in the case of BOC, for example trifluoroacetic acid or hydrochloric acid in ethyl acetate, or by catalytic hydrogenation in the case of Cbz. Advantageously, this is the Cbz group.

If A represents a sulphur atom, the A-protective group is an S-protective group. In this case, u is 1.

The term "S-protective group" means in the sense of the present invention, any substituent which protects the thiol group against undesirable reactions during the polymerization of OCAs such as the S-protective groups described in Greene, "Protective Groups In Organic synthesis", (John Wiley & Sons, New York (1981)). The S-protective groups comprise benzyl ethers (either substituted or not), for example p-methoxybenzyl or p-nitrobenzyl, trityl ethers, thioacetates, thioacetals and thioethers.

In the following, the term "polymer" will designate a poly (α-hydroxy acid) and the term "monomer" will designate an OCA, unless stated otherwise.

The expression "saturated or unsaturated alkyls" within the scope of the present invention designates alkanes, alkenes, or alkynes.

The term "aralkyl" within the scope of the present invention designates aryl radicals bound to alkyl radicals, such as for example benzyl or phenethyl.

The terms "heterocycloalkyl" and "heteroaromatic" within the scope of the present invention designate cycles, aliphatic or aromatic respectively, comprising one or more heteroatoms, selected from the group formed by nitrogen, oxygen and sulphur.

The term "halogen" designates chlorine, fluorine, iodine and bromine.

Within the scope of the present invention, the radicals may be protected by standard suitable protecting groups with which any undesirable reaction of said radicals may be limited or prevented during the polymerization reaction. As examples of groups which protect amine, hydrazine and guanidine functions, t-butyloxycarbonyl (Boc), 9-fluorenylmethyloxycarbonyl (Fmoc), benzyloxycarbonyl (Cbz) and benzyl may notably be mentioned. As examples of groups which protect alcohol functions, silyl ethers, acetates, acetals, ethers and ethers of PMB may notably be mentioned. As example of groups which protect carboxylic acid functions, esters may be mentioned such as benzyl, tertiobutyl, and trimethylsilyl esters. As examples of groups protecting thiol functions, thioacetates, thioacetals and thioethers may notably be mentioned.

According to an essential feature of the invention, the polymerization reaction of step i) is performed in a controlled manner, i.e., the number or weight average molar weight of the polymer obtained at the end of the synthesis reaction may be determined beforehand by adjusting the introduced molar amount of catalytic system relatively to the initial monomer molar amount, i.e. by adjusting the initial monomer/(catalytic system) molar ratio. Indeed, the inventors discovered that the number or weight average molar weight of the obtained polymer is a quasi-linear function of the initial monomer/(catalytic system) molar ratio, the slope depending on the solvent in which the reaction occurs (solvent effect). Polymers with a number average molar weight larger than 3,000 g/mol may easily be synthesized by introducing the required molar amount of catalytic system, relatively to the initial monomer molar amount.

The more it is desired to obtain a high molar weight polymer, the higher should be the initial monomer/(catalytic system) molar ratio, i.e., the lower should be the introduced molar amount of catalytic system relatively to the initial monomer molar amount.

According to an advantageous alternative of the invention, the polymerization method is characterized in that the monomer/(catalytic system) molar ratio is larger than 10, advantageously between 20 and 1,000, even more advantageously between 50 and 1,000, even more advantageously between 120 and 1,000, even more advantageously between 200 and 1,000.

Advantageously, the base present in the catalytic system according to the invention is a 5- or 6-membered aromatic heterocycle comprising at least one endocyclic nitrogen atom conjugated with another endocyclic or exocyclic nitrogen atom.

According to an alternative of the invention, said base is an amino-pyridine of formula (II)

(II)

wherein $R_5$ and $R_6$ represent independently of each other a saturated or unsaturated, linear or branched $C_1$-$C_6$ alkyl radical, or $R_5$ and $R_6$ form together a 5- or 6-membered heterocycloalkyl, the —$NR_5R_6$ group being in position 2 or 4.

The ring of the pyridines may also be substituted with one or more $C_1$-$C_6$ alkyl radicals.

In particular, said base is 4-dimethylamino pyridine (DMAP).

According to another alternative of the invention, said base advantageously is an imidazole of formula (III)

(III)

wherein R represents a saturated or unsaturated, linear or branched $C_1$-$C_6$ alkyl radical.

The imidazole ring may also be substituted with one or more $C_1$-$C_6$ alkyls.

In particular, said base is N-methyl-imidazole.

According to an advantageous alternative of the invention, the catalytic system according to the invention exclusively comprises one base. In this case, the radical Z, in the semi-structural formula of the polymer, represents the hydrogen atom and X represents the oxygen atom.

The initial monomer/base molar ratio is advantageously larger than 10, even more advantageously between 20 and 1,000, even more advantageously between 50 and 1,000, even more advantageously between 120 and 1,000, even more advantageously between 200 and 1,000.

According to another advantageous alternative of the invention, the catalytic system further comprises a protic reagent.

In the sense of the present invention, the expression "protic reagent" means any reagent which includes hydrogen atoms which may be released as protons.

With the protic reagent, by releasing at least one proton, the polymerization reaction may be initiated. Once the polymerization reaction is initiated, it is self-sustained by the alcohol function of the thereby formed oligomer.

The polymerization reaction may then be written as:

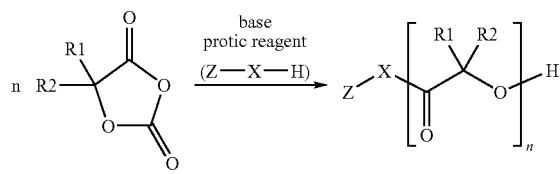

Z representing the remainder of the protic reagent and X representing a heteroatom selected from the group formed by N, O and S.

Within the scope of the present invention, the protic reagent is advantageously selected from the group formed by water, alcohols, primary and secondary amines, thiols, and polymers with an alcohol, amino or thiol functionality.

Within the scope of the present invention, any primary, secondary or tertiary alcohol may be used as a protic reagent. For example ethanol, pentanol, Boc-ethanolamine, or alcohols with a more complex structure may be used. Also, any primary or secondary amine may be used within the scope of the present invention. For example, benzylamine, hexylamine, oleylamine, ethanolamine, basic aminoacids such as lysine or C-protected peptides or amines with a more complex structure may be mentioned. Any thiol may also be used as a protic reagent. For example, benzylthiol, derivatives of cysteine may be used.

Within the scope of the present invention, the expression "polymers with alcohol, amine or thiol functionality" refers to all the polymers bearing substituents including at least one reactive function selected in the group formed by the —OH, —$NH_2$ and —SH functions.

The protic reagent is advantageously selected from the group formed by water, aliphatic $C_1$-$C_{12}$ alcohols, poly(glycolic acids), poly(lactic acids), and their copolymers.

According to an advantageous alternative of the invention, the protic reagent is selected from the group formed by poly (glycolic acids), poly(lactic acids), and their copolymers. (Lactide and/or glycolide)-OCA block copolymers are then obtained.

With the protic reagent, present in the catalytic system, the polydispersity index ($I_p$) (weight dispersion around the average molecular weight) which is closer to 1, may be better controlled, and control of the weight of the polymer is also facilitated.

During step i), the solvent is advantageously selected from the group formed by chlorinated aliphatic solvents, ethers, cyclic ethers or aromatics.

The polymer obtained following step i) may be purified during step ii) if necessary and then the polymer is recovered during step iii).

These operations for purifying and recovering the polymer are performed in a standard way, for example by removing the solvent by evaporation under reduced pressure, or by either concentrating or not the reaction medium, followed by precipitation with the addition of a non-solvent such as a $C_1$-$C_6$ alkane.

According to the embodiment wherein at least one $R_1$ or $R_2$ represents a salifiable side chain, the process may further comprise the following steps:

iv) protecting the terminal OH group of the polymer obtained in step iii) with an O-protective group different from B;

v) de-protecting the A group(s) of the polymer obtained in step iv) in order to obtain the AH group(s);

vi) de-protecting the terminal OG group of the polymer obtained in step v).

The term <<deprotecting>> or <<deprotected>> means the method by which a protective group is removed after completion of a selective reaction on an unprotected group. Certain protective groups may be preferred relatively to other ones because of their convenience and the relative facility of their removal. The deprotecting reagents for protected hydroxyl or carboxyl groups comprise potassium or sodium carbonates, lithium hydroxide in alcohol solutions, zinc in methanol, acetic acid, trifluoroacetic acid, palladium catalyst, hydrogen in the presence of palladium catalysts, hydrochloric or sulphuric acid, soda and organic bases (for example piperidine for removing the Fmoc group), or boron tribromide, and the like.

Steps iv)-vi) allow cleavage of protective groups of salifiable functions (A-(B)u) in order to obtain a polymer, the salifiable functions of which are no longer protected (AH).

In particular, in order to deprotect these salifiable functions (step v), the terminal hydroxyl function of the polymer obtained in step iii) (step iv) should advantageously be protected beforehand. This protection should be carried out with an O-protective group different from B, with an acetyl advantageously. This protecting step is therefore carried out by methods well known to one skilled in the art.

According to the protective group B used, step v) is carried out by methods well known to one skilled in the art. Thus, if B represents the Bn (benzyl) group, deprotection may occur by catalytic hydrogenation of the polymer obtained in step iv), advantageously in the presence of the 10% Pd/C catalyst.

In the optional step vi) a polymer, the terminal function of which OH is no longer protected, may be recovered. It is carried out by methods well known to one skilled in the art.

Polymers and materials are thereby obtained which have the dimensional, mechanical, chemical, biochemical and biological features required for all the contemplated applications of polyesters derived from (α-hydroxy acids:
  implants, dentistry, endoprostheses, orthopedic surgery,
  systems for in vivo addressing of active molecules, i.e., for controlled transport and delivery of active ingredients at the selected biological targets, whether in the medical or the cosmetic field.

With the invention, problems posed by forced application of the prior art method may be solved effectively:
  possibility of polymerizing and copolymerizing a very large number of α-hydroxy acids, including those comprising appropriately protected functional groups.
  increase and harmonization of the polymerization rates, this is sought after, not only for cost issues, but also for preparing "random" or "block" copolymers,
  access to "tailored" polymers, i.e., having the desired physical characteristics and chemical structures.

The polymers obtained by the method according to the invention advantageously have a polydispersity index between 1 and 2, more advantageously between 1 and 1.5, and even more advantageously between 1 and 1.3. The polymers obtained by the method according to the invention therefore have a narrowed molar weight distribution curve; the molar weights are therefore not very dispersed. The closer to 1 the value of the polydispersity index is, the larger is the number of formed macromolecules which have the same molar weight.

In the case of using polymers obtained by the method according to the invention in systems for in vivo addressing active molecules, it is particularly advantageous if these polymers have a polydispersity index close to 1.

A polydispersity index close to 1 confirms the "live" character of the polymerization, i.e., the absence of secondary reactions, and proper definition of the polymers including active terminations. With the narrowness of the molecular distribution, the weight composition of the drug preparation may further be more specifically adjusted according to the desired target and the involved biological mechanism. For example, in injectables, it is preferable that the molecules should be of the same size, in particular for facilitating passage into the capillaries. Finally, from a regulatory point of view, it is easier to have monomolecular active ingredients approved by drug approval agencies.

According to an alternative of the invention, the polymers obtained by the method according to the invention advantageously have a number average molar weight larger than 2,000 g/mol, even more advantageously larger than 5,000 g/mol.

According to another alternative of the invention, the polymers obtained by the method according to the invention advantageously have a number average molar weight larger than 25,000 g/mol, even more advantageously larger than 30,000 g/mol.

An other object of the present invention is new OCAs functionalized with a salifiable function.

It is important to be able to functionalize poly(α-hydroxyacids) with salifiable side chains. In particular, with the presence of functionalized chains derived from natural amino acids, natural polyamino acids (or proteins) may be mimicked and the assimilation and biocompatibility of these compounds may thereby be improved. A few polymers including carboxyl or hydroxyl chains, either protected or not, from the polymerization of lactides have been described. The polymers which are the closest structurally to OCAs functionalized by a salifiable group, are poly-p-malates described by Ouchi and Fujino (Makromol. Chem. 1989, 190, 1523). However, the malide dibenzylester monomer is only obtained with a yield of 14% and conversion during its homopolymerization is at most 15% after however 10 hours of heating at 200° C. Further, polymerization of the lactides generally requires the use of tin catalysts, the toxicity of which is well known.

An OCA with a side chain functionalized by an acid was already described (Al-Mesfer et al., Biomaterials (1987), 8 (5), 353-359). This is the OCA of tartronic acid. However, OCA preparation tests from other acids such as malic acid were negative and exclusively led to obtaining malic acid anhydride. Further, the described synthesis may only be used for tartronic acid, for which no corresponding anhydride is known, which promotes the synthesis of the corresponding OCA.

Finally, it is noted that polymerization of the OCA of tartronic acid is very fast and even too fast for being compared with that of non-functional OCAs, which excludes the possibility of contemplating copolymerizations.

The acid function of the OCA of tartronic acid is very close to the polymeric chain and this OCA is therefore different from those discovered by the present inventors. Moreover, this document does not use the polymerization method according to the present invention and therefore the polymerization of α-hydroxyacids cannot be controlled.

As a result, one of the goals of the invention is to provide new OCAs functionalized with a salifiable function, which can be used in a method (according to the present invention) for synthesizing poly(α-hydroxyacids), from these OCAs, with which finished products, i.e., polymers including this salifiable function, with a controllable number molar mass Mn, may be obtained. These new OCAs may easily be copolymerized with known non-functionalized OCAs.

The inventors have discovered new functionalized OCAs and new α-hydroxy acids prepared by controlled polymerization of functionalized OCAs according to the present method.

The object of the invention is an OCA with the following general formula IV:

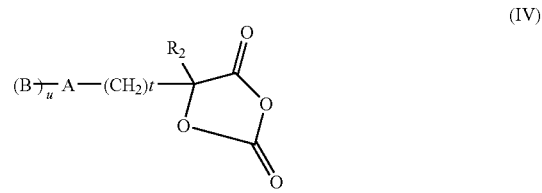

(IV)

wherein t is an integer between 1 and 10, advantageously between 1 and 6, in an advantageous way between 1 and 4, in a more advantageous way between 2 and 4;

A represents a heteroatom selected from O, N and S or a —COO or —NH radical,

B represents a group protecting A;

u is 1 or 2

$R_2$ represents a radical selected from the group formed by
hydrogen,
$(CH_2)t$-A-B)u wherein t, u, A and B are as defined earlier,
saturated or unsaturated, linear or branched $C_1$-$C_{12}$ alkyls,
$C_7$-$C_{20}$ aralkyls,
simple or fused $C_3$-$C_{14}$ cycloalkyls,
simple or fused $C_2$-$C_{14}$ heterocycloalkyls,
aromatic, simple or fused, $C_6$-$C_{14}$ radicals, and
heteroaromatic, simple or fused $C_3$-$C_{14}$ radicals or their addition salts, their isomers, enantiomers, diastereoisomers, or their mixtures.

$R_2$ advantageously represents a radical selected from the group formed by hydrogen, saturated or unsaturated, linear or branched $C_1$-$C_6$ alkyls, 5 or 6-membered (hetero)cycloalkyls and 5 or 6-membered heteroaromatic radicals. $R_2$ more advantageously represents a hydrogen atom.

In the sense of the present invention, an <<A-protective group>>, means a group protecting the AH function against undesirable reactions during polymerization of the OCAs.

The term <<protective group>> or <<protecting group>> are as defined above.

In the present invention, the term <<isomers>> is meant to designate compounds which have identical molecular formulae but which differ by the arrangement of their atoms in space. Isomers which differ in the arrangement of their atoms in space are designated by <<stereoisomers>>. Stereoisomers which are not mirror images of each other are designated by <diastereoisomers>>, and stereoisomers which are non-superposable mirror images are designated as <<enantiomers>>, or sometimes as optical isomers. A carbon atom bound to four non-identical substituents is called a <<chiral centre>>.

A <<chiral isomer>> means a compound with a chiral centre. It includes two enantiomeric forms with opposite chirality and it may exist either as an individual enantiomer or as a mixture of enantiomers. A mixture containing equal amounts of individual enantiomeric forms with opposite chirality is designated as <<a racemic mixture>>.

In the present invention, the term <<addition salts>> of a compound is meant to designate the salts of this compound formed in the following way:

(1) acid addition salts formed with inorganic acids such as hydrochloric acid, hydrobromic acid, sulfuric acid, nitric adic, phosphoric acid and the like; or formed with organic acids such as acetic acid, benzene-sulfonic acid, benzoic acid, campher-sulfonic acid, citric acid, ethane-sulfonic acid, fumaric acid, glucoheptonic acid, gluconic acid, glutamic acid, glycolic acid, hydroxynapthoic acid, 2-hydroethane-sulfonic acid, lactic acid, maleic acid, malic acid, mandelic acid, methane-sulfonic acid, muconic acid, 2-naphthalene-sulfonic acid, propionic acid, salicylic acid, succinic acid, debenzoyl-N-tartaric acid, tartaric acid, p-toluene-sulfonic acid, trimethylacetic acid, trifluoroacetic acid, and the like; or (2) the salts formed when an acid proton present in the parent compound is either replaced with a metal ion, for example an alkaline metal ion, an alkaline-earth metal ion, or an aluminium ion; or coordinates with an organic or inorganic base. Advantageous organic bases comprise diethanolamine, ethanolamine, N-methylglucamine, triethanolamine, tromethamine, and the like. Advantageous inorganic bases comprise aluminium hydroxide, calcium hydroxide, potassium hydroxide, potassium hydroxide, sodium carbonate and sodium hydroxide.

Preferred addition salts are salts formed from hydrochloric acid, trifluoroacetic acid, dibenzoyl-L-tartaric acid, and phosphoric acid.

Advantageously the OCA according to the present invention is such that in formula (I), B represents a benzyloxycarbonyl and A represents NH or B represents a benzyl and A represents O or a —COO group.

Advantageously, the OCA according to the present invention is selected from:

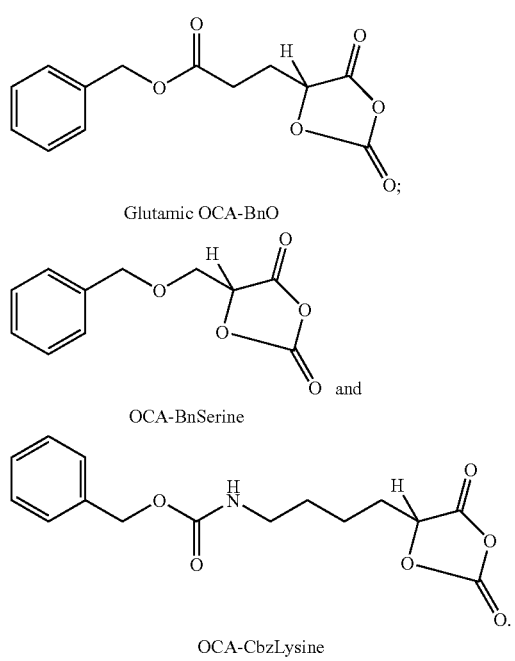

Glutamic OCA-BnO

OCA-BnSerine

OCA-CbzLysine

The OCAs according to the present invention may be obtained by phosgenation of the corresponding α-hydroxy acid, according to synthesis methods known to one skilled in the art According to a first alternative, the OCAs are obtained by phosgenation of the lithium salt of the α-hydroxy acid with the following formula (V):

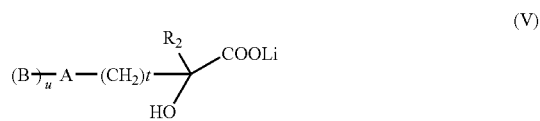

wherein t, A, B, u and $R_2$ are as defined in the general formula (IV), by reaction with a phosgenation agent, without adding a tertiary amine base, in the presence of an organic solvent, non-reactive with the phosgenation agent and at a temperature between −20° C. and +40° C., advantageously between −5° C. and +30° C., in an advantageous way between −20° C. and −5° C.

Unlike the methods described in the prior art, the presence of a tertiary amine base of the N-methylmorpholine type for scavenging hydrochloric acid is unnecessary in the method according to this alternative.

Thus, within the framework of this method according to this alternative, only the phosgenation agent, the compound with formula (V) and the solvent are required for obtaining the desired OCA.

According to a second alternative, the OCAs are obtained by phosgenation of the corresponding α-hydroxy acid, or one of its salts, in the presence of a tertiary amine organic base which may optionally be supported (on polystyrene for example).

The tertiary amine organic base is preferably diisopropylethylamine.

The features of the method for synthesizing OCAs, which follow, refer both to the first alternative method and to the second alternative method.

Advantageously, the phosgenation agent is selected from phosgene, diphosgene, or triphosgene, advantageously phosgene. In an advantageous way, the amounts of phosgenation agent and of compounds of formula (V) are equimolar or in a less advantageous way the phosgenation agent is present with a slight excess relatively to the compound of formula (V), this excess not exceeding 10 to 50% of the compound of formula (V).

In an advantageous way, the solvent is selected from ethers such as diethyl ether or THF, aromatic hydrocarbons such as toluene, and esters such as methyl formate. In a more advantageous way, this is THF or diethyl ether.

Advantageously, the reaction time is less than 20 hrs, in an advantageous way between 2 hours and 6 hours.

The compounds of formula (V), as for them, are easily obtained from the corresponding amino acids by methods well known to one skilled in the art.

The present invention also relates to novel polymers, which may be obtained by the method according to the invention, of formula (VI)

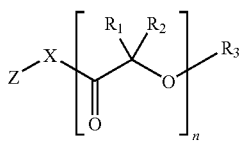

wherein
- $R_1$ and $R_2$ have the same meaning as given for the OCA of formula (I);
- X represents a heteroatom selected from the group formed by O, N and S, and Z represents a saturated or unsaturated, linear or branched $C_1$-$C_{12}$ alkyl radical;
- —X-Z represents a polymer selected from the group formed by the poly(glycolic acids), poly(lactic acids), and their copolymers, said polymers being terminated by a radical —X'-Z' wherein X' represents a heteroatom selected from the group formed by O, N and S, and Z' represents a saturated or unsaturated, linear or branched $C_1$-$C_{12}$ alkyl radical;
- $R_3$ represents a O-protective group or a hydrogen atom
- n is larger than or equal to 1, n advantageously is between 1 and 500, even more advantageously between 5 and 500, even more advantageously between 10 and 400, even more advantageously between 15 and 350.

According to an advantageous alternative of the invention, in formula (VI), X represents the O heteroatom, and Z represents a $C_1$-$C_6$ alkyl radical.

According to another advantageous alternative of the invention, in formula (VI), —X-Z represents a radical of formula (VII)

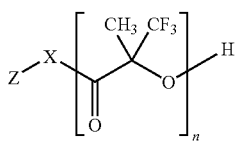

wherein R' represents H or $CH_3$, X' represents a heteroatom selected from the group formed by O, N and S, and Z' represents a saturated or unsaturated, linear or branched $C_1$-$C_{12}$ alkyl radical. In particular, X' represents the O heteroatom and Z' represents a $C_1$-$C_6$ alkyl radical.

The invention also relates to a polymer of formula (VIII)

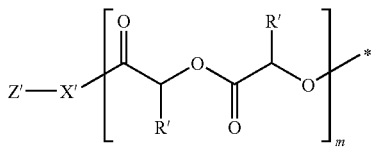

wherein X represents a heteroatom selected from the group formed by O, N and S, and Z represents a hydrogen atom or a saturated or unsaturated, linear or branched $C_1$-$C_{12}$ alkyl radical.

According to another advantageous alternative of the invention, $R_1$ represents a radical —$(CH_2)_t$-$R_4$ wherein $R_4$ represents -A-(B), or -A-H group, in which A, B and t are as defined earlier, B being different from $R_3$.

The polymers of formula (VI) or (VIII) advantageously have a polydispersity index between 1 and 2, more advantageously between 1 and 1.5 and even more advantageously between 1 and 1.3.

According to an alternative of the invention, the polymers of formula (VI) or (VIII) advantageously have a number average molar weight larger than 2,000 g/mol, even more advantageously larger than 5,000 g/mol.

According to an alternative of the invention, the polymers of formula (VI) or (VIII) advantageously have a number average molar weight larger than 25,000 g/mol, even more advantageously larger than 30,000 g/mol.

The present invention finally relates to the use of polymers capable of being obtained by the method according to the invention and of novel polymers described for vectoring active ingredients and for making biomaterials.

The following examples provide an illustration of the invention and they are non-limiting. Unless stated otherwise, in the following examples:
- the toluene, pentanol and THF (tetrahydrofurane) used were distilled over sodium. DCM (dichloromethane) and DCE (1,2-dichloroethane) were distilled on $CaH_2$. DMAP was re-crystallized from toluene;
- the number (Mn) and weight (Mw) average weights were determined by GPC (gas chromatography) in THF (Waters 600 pump; Waters 2410 refractive index detector; Waters Styragel HR1 and HR 5E columns). Polystyrene standards with low polydispersity index were used for establishing the calibration curve;
- $^1H$ NMR spectra were recorded in $CDCl_3$ (200 MHz Brucker spectrometer).

EXAMPLE 1

Figure 1:
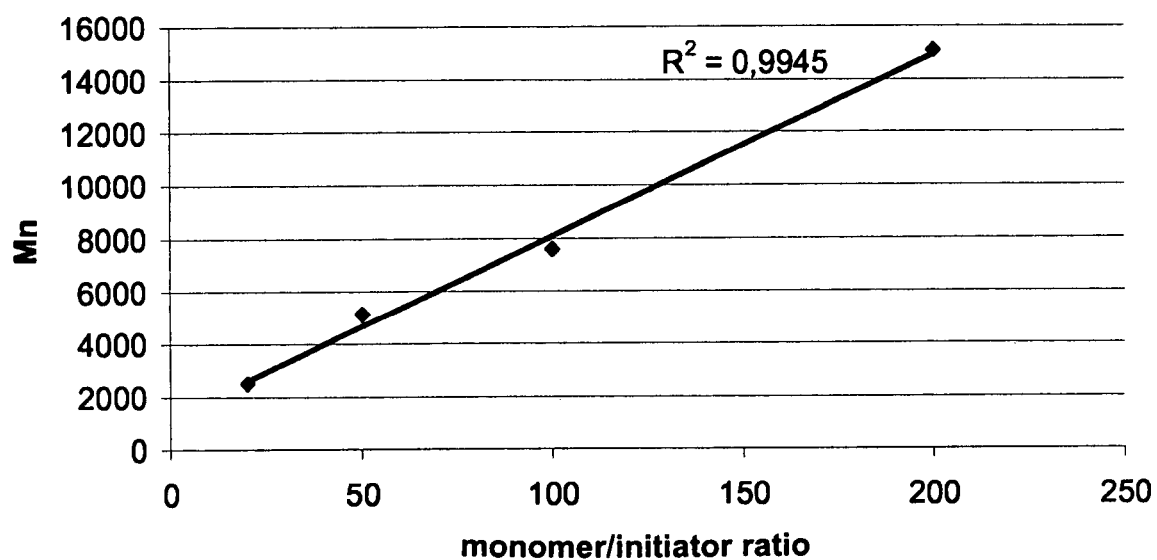
FIG. 1 represents the number average molar weight of the synthesized polymer versus the monomer/(catalytic system) ratio during polymerization of lac-OCA in dichloromethane, in the presence of n-pentanol as aprotic reagent.

Preparation of a Poly(Lactic Acid) With a Molar Weight Larger Than 20,000

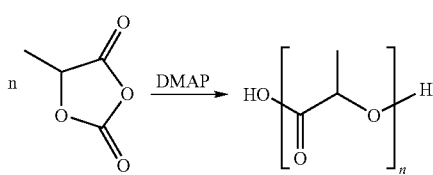

Under an inert atmosphere, anhydrous distilled dichloromethane (1.7 mL) and the OCA of (D,L) lactic acid (0.465 g; 4.0 mmol) are introduced into a 5 mL reactor. After solubilization, DMAP (2.2 mg; 0.018 mmol) is introduced, i.e., [OCA]/[DMAP] ratio=220. The medium is maintained under stirring at 25° C. until release of carbon dioxide gas stops.

Polymerization is completed in less than 30 min. After removal of the solvent by evaporation under reduced pressure, the expected polymer (0.29 g) is collected with a yield larger than 98%. Its number average molar weight ($M_n$) is 30,400 with a polydispersity index ($I_p=M_w/M_n$) equal to 1.18.

A second polymerization operation is carried out exactly under the same conditions. The expected polymer with $M_n$=29,300 and $I_p$=1.18 is obtained.

The operation is started again, still under the same conditions. The obtained polymer has a $M_n$=34,900 and an $I_p$=1.13.

DMAP-catalyzed homopolymerization of the OCA derived from lactic acid, is therefore highly reproducible.

EXAMPLE 2

Homopolymerization of 5,5-dimethyl-1,3-dioxolane-2,4-dione in Presence of DMAP and n-pentanol.

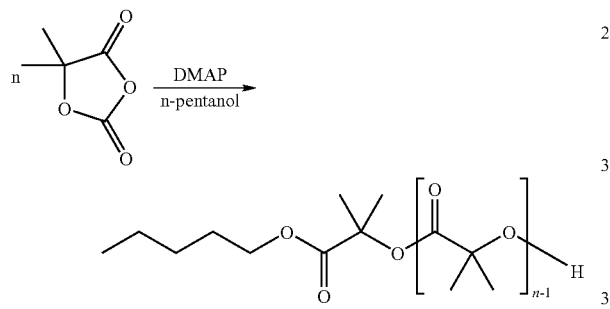

Anhydrous dichloromethane (1.5 mL) and the OCA derived from 2-hydroxy isobutyric acid (0.5 g; 3.84 mmol) are introduced into a 5 mL reactor under an inert atmosphere. After solubilization, DMAP (28.46 mg; 0.232 mmol) solubilized in dichloromethane (1 mL) is introduced, followed by n-pentanol (10.27 mg; 0.116 mmol), i.e. [OCA]/[n-pentanol] ratio=33. The medium is brought to 33° C. Polymerization is complete after 1.75 hours at this temperature.

The medium is then concentrated under reduced pressure in order to obtain the expected polymer with quantitative yield:

Results: $M_n$=3,574, $I_p$=1.12, $M_{th}$=2,926 (GPC, THF, polystyrene standards, WATERS) $^1$H NMR (CDCl$_3$): 1.51 (large, CH$_3$).

The obtained molar weight ($M_n$) is close to the expected one ($M_{th}$).

EXAMPLE 3

Homopolymerization of 5,5-dimethyl-1,3-dioxolane-2,4-dione With High [OCA]/[DMAP] and [OCA]/[n-pentanol] Ratios One proceeds as in Example 2 but at 55° C., in 1,2-dichloroethane as a solvent. [OCA]/[DMAP]=60 and [OCA]/[n-pentanol]=120 ratios are used. The expected polyester with $M_n$=18,000 and $I_p$=1.00 is obtained quantitatively.

EXAMPLE 4

Homopolymerization of 5-phenyl-1,3-dioxolane-2,4-dione in the Presence of Water (Protic Reagent)

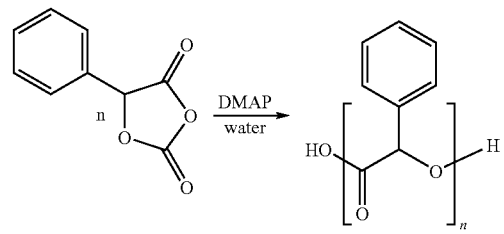

The OCA derived from S-mandelic acid (0.3 g; 1.68 mmol) is introduced into a schlenk under an argon atmosphere. Dichloromethane (1.5 mL) and DMAP (37.4 mg; 0.306 mmol) are introduced into another schlenk. After solubilization of DMAP, this mixture is introduced in a first schlenk by means of a cannula. Water (2.76 µL; 0.153 mmol) is added and brought to 33° C. under stirring. Polymerization is completed after 4 hours at this temperature.

The solvent is removed by evaporation under reduced pressure, leading to the expected polymer with quantitative yield.

Results: $M_w$=1,520, $I_p$=1.08, $M_{th}$=1,492 (GPC, THF, polystyrene standards, WATERS chain) $^1$H NMR (CDCl$_3$): 6.06 (large, 1H, CH), 7.25 (large, 5H, Ph). Electrospray (CH$_3$CN+ NH$_4$OH): m/z=18+n*134+23(Na$^+$) with n=2,3, . . . 12.

EXAMPLE 5

Polymerization of HOCA in Different Solvents and for Different Monomer/Base/Protic Reagent Ratios HOCA represents the OCA derived from 2-hydroxy isobutyric acid, i.e., 5,5-dimethyl-1,3-dioxolane-2,4-dione

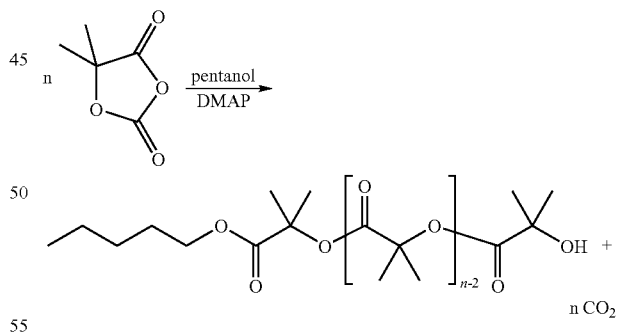

a) Reaction in toluene i) Monomer/base/protic reagent ratio of 50/1/1.

In a schlenk tube dried beforehand, HOCA (3.44 mmol; 447 mg) is put into solution in 4.5 mL of toluene. Pentanol (0.069 mmol; 7.5 pl) and DMAP (0.069 mmol; 8.4 mg) are added successively. The reaction medium is heated to 50° C.

Progress of the reaction is followed by $^1$H NMR. Conversion is complete after 90 min. Evolution of the average weights is checked by GPC and given in the following Table 1:

TABLE 1

| Time (min) | $M_n$ | $M_w$ | PI | Conversion |
|---|---|---|---|---|
| 30 | 3,972 | 4,538 | 1.14 | 75 |
| 60 | 5,313 | 6,460 | 1.21 | 92 |
| 90 | 5,602 | 7,265 | 1.30 | 100 |
| 145 | 6,200 | 7,499 | 1.21 | |
| 180 | 6,130 | 7,199 | 1.17 | |
| 330 | 6,393 | 7,281 | 1.14 | |

These results show that when the monomer has been fully consumed (conversion of 100), the number or weight average molar weight of the obtained polymer does not vary significantly.

ii) Monomer/base/protic reagent ratio of 200/1/1.

In a schlenk tube dried beforehand, HOCA (4.35 mmol; 566 mg) is put into solution in 6.0 mL of toluene. Pentanol (0.022 mmol; 160 μl from a 0.138 M solution of pentanol in toluene) and DMAP (0.022 mmol; 290 μL from a 0.075 M solution of DMAP in toluene) are added successively. The reaction medium is heated to 50° C.

Progress of the reaction is followed by $^1$H NMR. Conversion is complete after 300 min.

The solvent is removed under reduced pressure. The obtained polymer is triturated in 10 mL of MTBE; it is filtered and then rinsed with MTBE. The polyester (260 mg of white powder; 70%) is dried in vacuo.

Results: $M_n$=12,400, $M_w$=14,200, $I_p$=1.15.

iii) Monomer/base/protic reagent ratio of 400/1/1.

In a schlenk tube dried beforehand, HOCA (3.92 mmol; 510 mg) is put into solution in 1.0 mL of toluene. Pentanol (0.010 mmol; 60 μl from a 0.165 M solution of pentanol in toluene) and DMAP (0.010 mmol; 190 μL from a 0.052 M solution of DMAP in toluene) are added successively. The reaction medium is heated to 50° C. Progress of the reaction is followed by $^1$H NMR. Conversion is complete in 120 min.

Results: $M_n$=33,100, $M_w$=49,600, $I_p$=1.50.

b) Reaction in THF i) Monomer/base/protic reagent ratio of 50/1/1.

In a schlenk tube dried beforehand, HOCA (4.41 mmol; 574 mg) is put into solution in 6.0 mL of THF. Pentanol (0.088 mmol; 10 μl) and DMAP (0.088 mmol; 10.8 mg) are added successively. The reaction medium is heated to 50° C.

Progress of the reaction is followed by $^1$H NMR, conversion is complete in 300 min. Evolution of the average weights is checked by GPC and given in the following Table 2:

TABLE 2

| Time (min) | $M_n$ | $M_w$ | PI | Conversion |
|---|---|---|---|---|
| 30 | 891 | 964 | 1.08 | 25 |
| 60 | 1,488 | 1,743 | 1.17 | 38 |
| 90 | 2,190 | 2,772 | 1.27 | 51 |
| 120 | 2,781 | 3,714 | 1.34 | 64 |
| 150 | 3,288 | 4,420 | 1.34 | 82 |
| 180 | 3,399 | 4,595 | 1.35 | 92 |
| 210 | 3,486 | 4,689 | 1.34 | 98 |
| 300 | 3,539 | 4,700 | 1.33 | 100 |

These results show that when the monomer has been totally consumed (conversion of 100), the number or weight average molar weight of the obtained polymer does not vary significantly.

ii) Monomer/base/protic reagent ratio of 15/1/1.

In a schlenk tube dried beforehand, HOCA (3.04 mmol; 395 mg) is put into solution in 4.0 mL of THF. Pentanol (0.20 mmol; 22.0 μl) and DMAP (0.20 mmol; 24.6 mg) are added successively. The reaction medium is stirred at room temperature.

The reaction medium is controlled by $^1$H NMR after 2 hours: full consumption of monomer.

The evolution of the average weights is followed by GPC and given in the following Table 3:

TABLE 3

| Time (h) | $M_n$ | $M_w$ | PI |
|---|---|---|---|
| 3.0 | 894 | 929 | 1.04 |
| 4.75 | 1,024 | 1,155 | 1.13 |
| 8.5 | 1,275 | 1,617 | 1.25 |
| 28 | 1,321 | 1,675 | 1.27 |

The solvent is removed under reduced pressure. The obtained polymer is triturated in 2 mL of ice cold MTBE; it is filtered and then rinsed with ice cold MTBE. The polyester (180 mg of white powder; 63%) is dried in vacuo.

Results: $M_n$=1,680, $M_w$=1,880, $I_p$=1.12.

These results show that the monomer was totally consumed (conversion of 100), the number or weight average molar weight of the obtained polymer does not vary significantly.

c) Reaction in DCE i) Monomer/base/protic reagent ratio of 50/1/1.

In a schlenk tube dried beforehand, HOCA (5.29 mmol; 689 mg) is put into solution in 7.0 mL of DCE. Pentanol (0.106 mmol; 11 μL) and DMAP (0.106 mmol; 12.9 mg) are added successively. The reaction medium is heated to 50° C.

Progress of the reaction is followed by $^1$H NMR. Conversion is complete within 130 min. The evolution of the average weights is checked by GPC and is given in the following Table 4:

TABLE 4

| Time (min) | $M_n$ | $M_w$ | PI | Conversion |
|---|---|---|---|---|
| 30 | 2,659 | 3,007 | 1.13 | not determined |
| 70 | 3,199 | 3,480 | 1.09 | not determined |
| 130 | 3,777 | 4,090 | 1.08 | 100 |
| 180 | 3,845 | 4,152 | 1.08 | |
| 210 | 3,807 | 4,109 | 1.08 | |

After 4 h at 50° C., the solvent is removed under reduced pressure. The obtained polymer is triturated in 10 mL of MTBE; it is filtered and then rinsed with MTBE. The polyester (410 mg of white powder; 88%) is dried in vacuo.

Results: $M_n$=4,350, $M_w$=4,000, $I_p$=1,09.

These results show that when the monomer has been totally consumed (conversion of 100), the number or weight average molar weight of the obtained polymer does not vary significantly.

EXAMPLE 6

Lactide/HOCA Block Copolymerization a) Initiation With Pentanol, Lactide/HOCA/n-pentanol Ratio=20/20/1

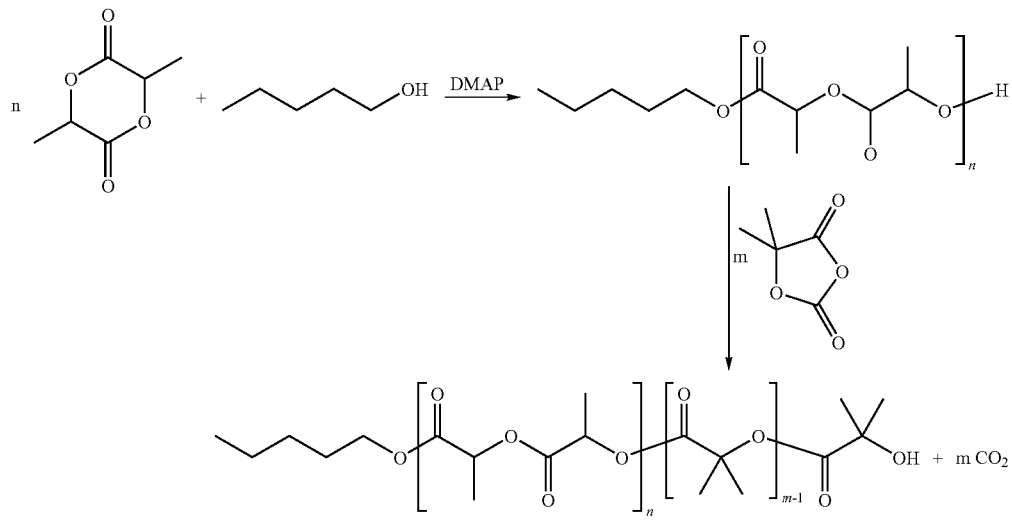

In a schlenk tube dried beforehand, the lactide (4.54 mmol; 650 mg) is put into solution in 6.0 mL of DCM. Pentanol (0.23 mmol; 24 µl) and DMAP (0.45 mmol; 55 mg) are added successively. The reaction medium is heated to 35° C. for 48 h (complete consumption of the lactide).

Results: $M_n$=2,750, $M_w$=3,290, $I_p$=1.19 (theoretical $M_n$=2,968).

HOCA (4.51 mmol; 590 mg) is added to the reaction medium and the latter is again heated to 35° C. for 3 hrs (complete consumption of HOCA).

$M_n$=3,850, $M_w$=4,910, $I_p$=1.28 (theoretical $M_n$=4,408).

The reaction medium is diluted with 10 mL of DCM and washed with 10 mL of 2N HCl. It is decanted and the aqueous phase is extracted twice with 10 mL of DCM. The organic phases are collected, washed with water and dried on anhydrous magnesium sulphate. The solvent is evaporated in order to obtain a white powder (810 mg; 78%). The polymer is triturated in 10 mL of isopropyl ether, it is filtered and dried in vacuo.

Results: $M_n$=4,150, $M_w$=5,250, $I_p$=1,27.

b) Initiation With Pentanol, Lactide/HOCA/n-pentanol Ratio=20/93/1

In a schlenk tube dried beforehand, the lactide (1.25 mmol; 180 mg) is put into solution in 2.0 mL of DCM. Pentanol (0.063 mmol; 7 µL) and DMAP (0.125 mmol; 15 mg) are added successively. The reaction medium is heated to 35° C. for 6 days (complete consumption of the lactide).

Results: $M_n$=4,820; $M_w$=6,290, $I_p$=1.31.

HOCA (5.84 mmol; 760 mg) is added to the reaction medium and the latter is again heated to 35° C. for 3 h (complete consumption of HOCA).

Results: $M_n$=10,000, $M_w$=14.410, $I_p$=1.44.

c) Initiation With Water: Lactide/HOCA/Water Ratio=10/10/1

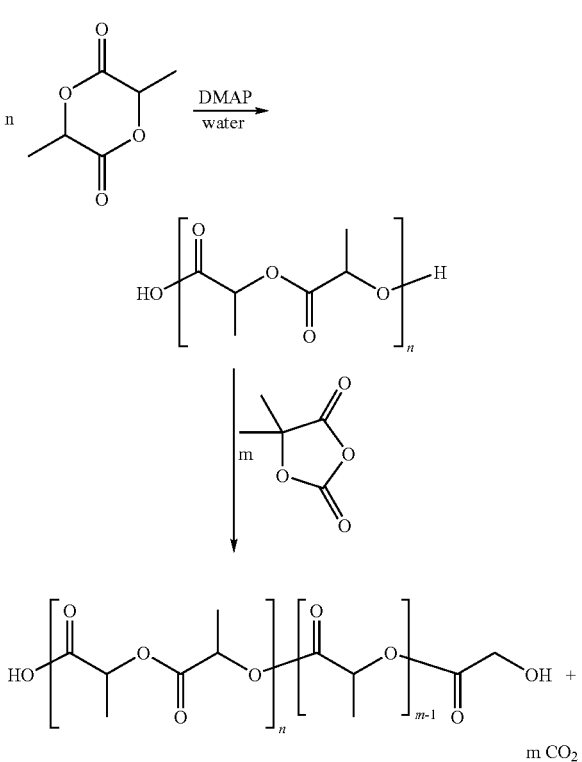

In a schlenk tube dried beforehand, the lactide (3.84 mmol; 550 mg) is put into solution in 4.0 mL of DCM. A solution of DMAP (0.77 mmol; 94 mg) in 1 mL of DCM and water (0.38 mmol; 7 μL) are added successively. The reaction medium is heated to 33° C. for 40 hrs.

Analysis of the polylactide via $^1$H NMR confirms complete consumption of the lactide. The presence of the characteristic proton signal in the alpha position of the terminal hydroxyl (quadruplet at 4.32 ppm) is noticed.

Results: $M_n$=1,210, $M_w$=1,640, $I_p$=1.36 (theoretical $M_n$=1,458).

HOCA (3.84 mmol; 500 mg) is added and the reaction medium is again heated to 33° C. for 2 hrs 30 min.

Analysis of the copolymer via $^1$H NMR shows complete consumption of HOCA and 20 the disappearance of the characteristic signal of the proton in the alpha position of the terminal hydroxyl of the polylactide. This observation confirms that the terminal hydroxyl of the polylactide actually plays the role of protic reagent (initiator) in the catalytic system during polymerization of HOCA.

Results: $M_n$=1,610, $M_w$=2,220, $I_p$=1.38 (theoretical $M_n$=2,318).

EXAMPLE 7

Lactide/Lac-OCA Block Copolymerization
Lactide/Lac/OCA/n-pentanol Ratio=20/52.1

EXAMPLE 8

Polymerization of Lac-OCA in the Presence of a Protic Reagent

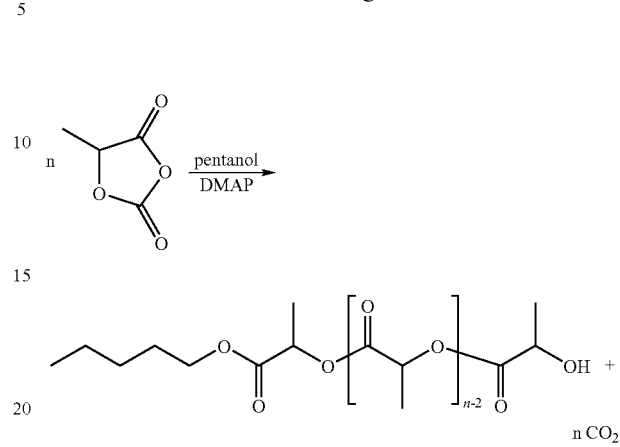

Influence of the Selected Base—DMAP/2,6-Lutidine Comparison

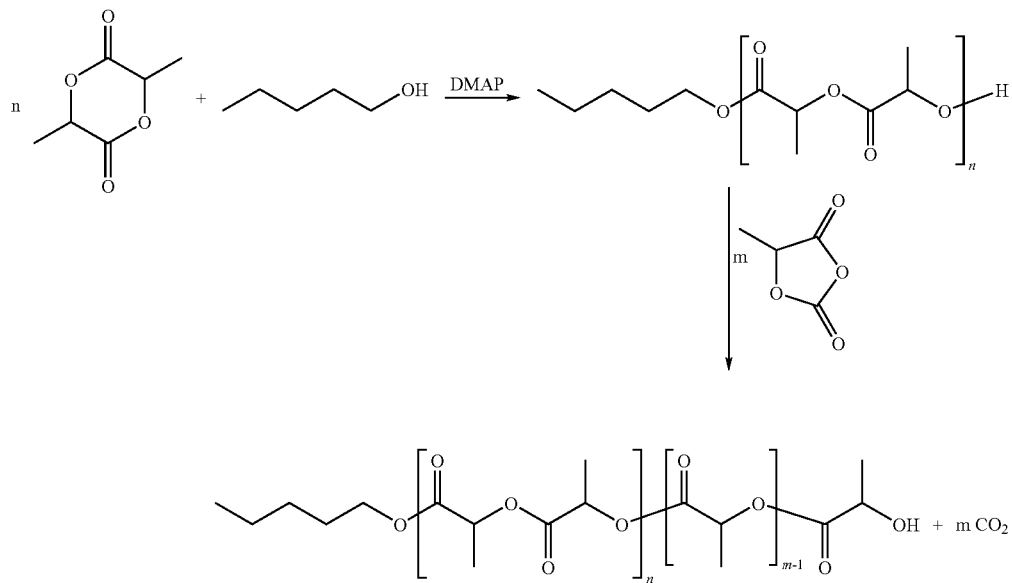

In a schlenk tube dried beforehand, the lactide (1.53 mmol; 220 mg) is put into solution in 2.0 mL of DCM. Pentanol (0.077 mmol; 8 μL) and DMAP (0.153 mmol; 19 mg) are added successively. The reaction medium is heated to 35° C. for 6 days (complete consumption of the lactide).

Results: $M_n$=4,340, $M_w$=5,320, $I_p$=1.22.

Lac-OCA (3.97 mmol; 460 mg) is added to the reaction medium and the latter is again heated to 35° C. for 3 hrs (complete consumption of Lac-OCA).

Results: $M_n$=8,130, $M_w$=106,700, $I_p$=1.31.

The PLA may therefore be actually used as a protic reagent in the catalytic system.

In a schlenk tube dried beforehand, the lac-OCA (50 equivalents) is put into solution in 10 volumes of DCM. Pentanol (1 equivalent) and DMAP (1 equivalent) or 2,6-lutidine (1 equivalent) are added successively. The reaction medium is stirred at room temperature.

The results are given in the following Table 5

TABLE 5

| Catalyst | $M_n$ | $M_w$ | PI | Duration (hrs) |
|---|---|---|---|---|
| 2,6-lutidine | 1,469 | 2,607 | 1.77 | 16 |
| DMAP | 5,113 | 7,233 | 1.41 | 0.25 |

These results show that higher molar weights are obtained when DMAP is used instead of 2,6-lutidine. Moreover, by using DMAP, polymers with a polydispersity index closer to 1 may be obtained.

Investigation of the Monomer/Protic Reagent/Base Ratio

In a schlenk tube dried beforehand, the lac-OCA (X equivalents) is put into solution in 10 volumes of DCM. pentanol (1 equivalent) and DMAP (1 equivalent) are added successively. The reaction medium is stirred at room temperature. At the end of the release of $CO_2$, the reaction is controlled via $^1$H NMR. The results are given in the following Table 6 and plotted in FIG. 1

TABLE 6

| X | $M_n$ | $M_w$ | PI | Duration (min) |
|---|---|---|---|---|
| 20 | 2,499 | 3,222 | 1.29 | 10 |
| 50 | 5,113 | 7,233 | 1.41 | 15 |
| 100 | 7,590 | 14,154 | 1.86 | 30 |
| 200 | 15,070 | 28,867 | 1.72 | 50 |

FIG. 1 represents the number average molar weight of the synthesized polymer versus the monomer/(catalytic system) ratio during polymerization of lac-OCA in dichloromethane, in the presence of n-pentanol as aprotic reagent.

These results show that molar weight of the obtained polymer is a linear function of the monomer/(catalytic system) ratio.

Initiation With Isopropanol

In a schlenk tube dried beforehand, 328 mg of lac-OCA (2.83 mmol) are put into solution in 10 volumes of DCM. 14 µL of isopropanol (0.19 mmol) and 23 mg of DMAP (0.19 mmol) are added successively. The reaction medium is stirred at room temperature. At the end of the release of $CO_2$, the reaction is controlled by $^1$H NMR.

Results: GPC: $M_n$=1,908, $M_w$=2,826; $I_p$=1.48.

These results show that the nature of the protic reagent has no significant influence on controlling the polymerization.

Initiation With Ethyl Lactate

In a schlenk tube dried beforehand, 197 mg of lac-OCA (1.71 mmol) are put into solution in 10 volumes of DCM. 20 µL of ethyl lactate (0.17 mmol) and 21 mg of DMAP (0.17 mmol) are added successively. The reaction medium is stirred at room temperature for 1 hr. The solvent is removed under reduced pressure (0.5 mmHg; $t_{bp}$ of ethyl lactate=153° C./760 mmHg). The polymer is triturated in pentane. The pentane is removed. The polymer is dried in vacuo.

Results: GPC: $M_n$=1,300, $M_w$=1,770; $I_p$=1.35.

$^1$H NMR confirms incorporation or ethyl lactate.

These results show that the nature of the protic reagent has no significant influence on controlling the polymerization.

EXAMPLE 9

DMAP—Catalyzed Polymerization of L-lacOCA

Materials. All reactions were performed under inert atmosphere of argon, using standard Schlenk techniques. Solvents were dried and distilled prior to use: toluene (>99.9%), THF (>99.9%) and diethyl ether (>99.9%) over sodium, pentane (>99%) over calcium dihydride and dichloromethane (>99.95%) over phosphorous pentoxide. L-lacOCA was prepared according to literature procedure, purified by two recrystallisations in diethyl ether and stored under argon at −20° C. Dimethylaminopyridine (DMAP) (99%, ALDRICH) was purified by recrystallization in toluene and stored under argon. n-Pentanol (99+%), neo-Pentanol (99%) and i-Propanol (99+%) were dried over sodium and distilled before use.

Control Experiment for Lactide Polymerization

L-Lactide (89 mg, 0.65 mmol, 10 equiv) was dissolved in dichloromethane (0.2 mL) and a DCM solution of neo-Pentanol and DMAP (0.63 mL, 0.10 mol.L$^{-1}$ equiv) was added. The reaction mixture was stirred at 35° C. and monitored by $^1$H NMR. The reaction was stopped after 96 h (93% conversion showed by $^1$H NMR).

$DP_{NMR}$=19

SEC (THF): $M_n$=2980, $M_w/M_n$=1.24

General Procedure for L-lacOCA Polymerization

L-lacOCA (157 mg, 1.35 mmol, 50 equiv) was dissolved in dichloromethane (1.6 mL) and a DCM solution of neo-Pentanol and DMAP (0.14 mL, 0.19 mol.L$^{-1}$ equiv) was added. The reaction mixture was stirred at room temperature until $CO_2$ no longer evolved. The complete monomer consumption was confirmed by $^1$H NMR spectroscopy. The reaction mixture was diluted with DCM (4 mL) and washed with cold 2N HCl (2×5 mL), brine (5 mL) and dried over $Na_2SO_4$. The solvent was removed by evaporation to give the polymer as a white solid (100 mg, 99%).

$^1$H NMR (CDCl$_3$, 300 MHz): δ 0.93 (s, 9H, $CH_2C(CH_3)_3$), 1.60-1.40 (m, 148 H, OCHCH$_3$ 3.84 (dd, J=10.5 Hz, 2H, $CH_2C(CH_3)_3$), 4.30 (q, J=7.2 Hz, 1H, HOCHCH$_3$) 5.16 (q,J= 6.9 Hz, 49 H, OCHCH$_3$).

$DP_{NMR}$=50

SEC (THF): $M_n$=5930, $M_w/M_n$=1.13

Procedure for the Determination of the Relationship Between DP and Monomer Conversion Polymerization was carried out in a NMR tube (CDCl$_3$ solution, 29 mg of L-lacOCA, 100 equiv) and monitored by $^1$H NMR (500 MHz) at 25° C. At t=0, a DCM solution of neo-Pentanol and DMAP (12 µL, 1 equiv) was added. NMR spectra were recorded (NS=1) each 2 minutes during the first 30 minutes then each 5 minutes until completion.

Influence of the Reaction Time on the Polymer

A PLA with $M_n$=9130 and $M_w/M_n$=1.14 just after complete monomer consumption was kept in the polymerization conditions (dichloromethane, 25° C., DMAP) for 3 days. No significant modification could be detected by SEC ($M_n$=9100 and $M_w/M_n$=1.16).

TABLE 7

L-lacOCA polymerization with the protic reagent/DMAP system.[a]

| Entry | Protic reagent | $[M]_0/[I]_0$ | Time[b] | DP(NMR)[c] | $M_n$[d] | $M_w/M_n$[d] |
|---|---|---|---|---|---|---|
| 1 | neo-Pentanol | 11 | <5 | 12 | 1220 | 1.22 |
| 2 | neo-Pentanol | 20 | 5 | 20 | 2110 | 1.20 |

TABLE 7-continued

L-lacOCA polymerization with the protic reagent/DMAP system.[a]

| Entry | Protic reagent | [M]$_0$/[I]$_0$ | Time[b] | DP(NMR)[c] | M$_n$[d] | M$_w$/M$_n$[d] |
|---|---|---|---|---|---|---|
| 3 | neo-Pentanol | 50 | 20 | 50 | 5930 | 1.13 |
| 4 | neo-Pentanol | 100 | 90 | 97 | 11980 | 1.16 |
| 5 | neo-Pentanol | 200 | 120 | 197 | 24460 | 1.21 |
| 6 | neo-Pentanol | 400 | 480 | 386 | 39510 | 1.27 |
| 7 | neo-Pentanol | 600 | 1140 | 592 | 62290 | 1.18 |
| 8 | n-Pentanol | 20 | 5 | 20 | 2620 | 1.19 |
| 9 | i-Propanol | 20 | 5 | 21 | 2510 | 1.34 |
| 10 | Cholesterol | 20 | 5 | 21 | 2610 | 1.21 |
| 11 | 2-Bromoethanol | 20 | 5 | 18 | 1870 | 1.17 |

[a]Polimerizations of L-lacOCA in CH$^2$Cl$^2$ were carried out at 25° C. with a protic reagent to catalyst ratio of 1. In all experiments conversion were higher than 96%.
[b]In minutes.
[c]Calculated by relative integration of the methyl signals (polymer and ester chain end) in $^1$H NMR experiments.
[d]Obtained from Size Exclusion Chromatography (in tetrahydrofuran, THF) using polystyrene standards.
DP = degree of polymerization Variation of the monomer/initiator ratio led to PLAs with molecular weights up to 60,000 g/mol, closely matching those predicted for DP's from 10 to 600 (Table 7). The polydispersities are fairly low (<1.3) up to high monomer conversion, and even after prolonged reaction time, demonstration that undesirable transesterification reaction did not occur to a signification extent.

Second-feed experiment: 50 equiv. of L-lacOCA were polymerized with neo-Pentanol/DMAP (1/1) in dichloromethane at 25° C. After 45 minutes, CO$_2$ no longer evolves and SEC analysis indicated the formation of a PLA with M$_n$=5120 g/mol and M$_w$/M$_n$=1.13. Polymerization was then restarted with 50 equiv. of L-lacOCA to afford, after additional 60. minutes, a PLA with M$_n$=10400 g/mol and M$_w$/M$_n$=1.14.

Theses results further support the living character of the polymerization.

EXAMPLE 10

Synthesis of the OCA-CF$_3$Me Monomer a) Synthesis of 2-hydroxy-2-(trifluoromethyl)-propionic acid

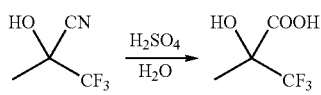

Methyltrifluoromethyl cyanhydrine (15.0 g: 108.0 mmol) is added dropwise on sulphuric acid. 75 mL of water are added carefully. The reaction medium is heated to 95° C. for several hours, and then cooled and saturated with sodium chloride. The hydroxy acid is extracted with ethyl ether. The etherated phases are collected and dried on sodium sulphate.

The solvent is evaporated under reduced pressure and the obtained grey powder is triturated in pentane. The hydroxy acid is filtered as a white powder (14.8 g; 87%).

$^1$H NMR (CDCl$_3$; 250 MHz): 1.67(s, 3H)
$^{19}$F NMR (CDCl$_3$; MHz): −4.35(s, CF$_3$)

b) Synthesis of 5-methyl-5-trifluoromethyl-1,3-dioxolane-2,4-dione

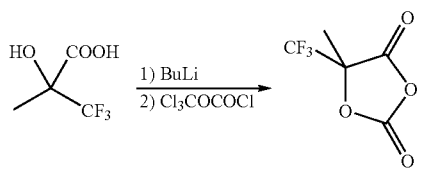

A 2 M butyl lithium solution in pentane (16.5 mL; 33.0 mmol) is slowly added, under an inert and cold atmosphere to a solution of hydroxy acid (4.74 g; 30.0 mmol) in 40 mL of diethyl ether. The reaction medium is stirred for few hours and then diphosgene (4.45 g; 22.5 mmol) is added dropwise and the reaction medium is stirred for several hours. The solvent is removed, the obtained residue is stirred in the presence of active charcoal. The charcoal is filtered and the solvent is evaporated in order to recover a colorless liquid (1.80 g; 33%), Bp: 22° C./0.3 mmHg.

$^1$H NMR (CDCl$_3$; 250 MHz): 1.92(s, 3H)
$^{19}$F NMR (CDCl$_3$; MHz): −3.25(s, CF$_3$)
$^{13}$C NMR (CDCl$_3$; 75 MHz): 15.9; 83.3 (q, $^2$J$_{CF}$=33Hz); 120.6(q, $^1$J$_{CF}$=284Hz);

This monomer may then be polymerized according to the polymerization method exemplified above.

EXAMPLE 11

Synthesis of BnOGlu-OCA

Synthesis of γ-benzyl-2-hydroxyglutaric acid: (Deechongkit, S. et al., Org. Lett 2004, 6, 497-500; Civitello, E. R. et al., J. Org. Chem. 1994, 59, 3775-3782)

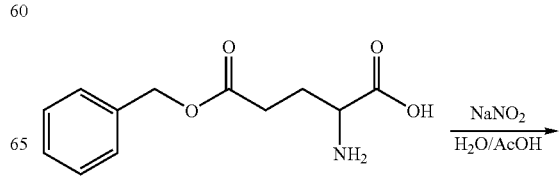

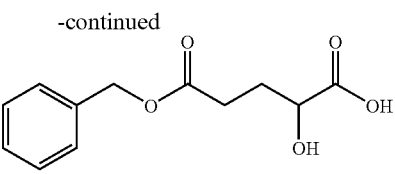

Add within 30 min at 0° C. 10 mL of 2M NaNO$_2$ solution (20.0 mmol) to a suspension of L-BnOGlu (2.37 g; 10.0 mmol) in 100 mL of a H$_2$O/AcOH 8/2 mixture. Stir for 4 h at room temperature. The reaction medium is then homogeneous. Add 100 mL of water and extract with AcOEt (3×50 mL). Wash with brine and then dry on sodium sulfate. Evaporate the solvent in order to obtain 2.70 g of viscous oil. The raw material is purified by flash chromatography (100 g of silica). Eluent: DCM 95/MeOH 4.5/AcOH 0.5. Recover a slightly colored oil (1.38 g, 58%).

$^1$H NMR (CDCl$_3$-300 MHz): 7.35 (m, 5H); 5.13 (s, 2H); 4.31 (dd, 1H, J$_{HH}$=7.6
2.6 (m, 2H); 2.0-2.3 (m, 2H).
$^{13}$C NMR (CDCl$_3$-75 MHz): 171.2; 166.6; 147.9; 135.2; 128.7-128.2; 78.0; 67.1; 28.4; 26.0.

Synthesis of Glutamic OCA:

Protocol No.1

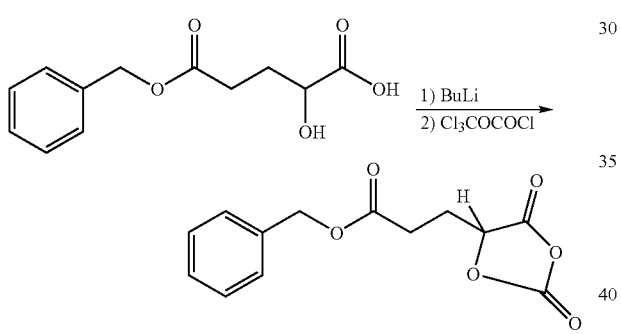

To a hydroxy acid solution (4.20 mmol; 1.0 g) in anhydrous diethyl ether, add within 15 minutes and at −30° C. a BuLi solution (4.20 mmol). The reaction medium quickly becomes heterogeneous. Stir for 1 hour at −20° C. Add at −20° C., the diphosgene (4.20 mmol; 0.50 mL) to the lithium salt suspension. Stir the reaction medium for 2.5 hours at −20° C. and then check with $^1$H NMR. The insoluble lithium salts are filtered off under an inert atmosphere and rinsed with 10 mL of anhydrous diethyl ether. The solvents are removed under reduced pressure and the obtained oil is rinsed with pentane (2×10 mL). The oily residue is triturated in diisopropyl ether. The expected product crystallizes from the medium as white crystals (0.41 g, 37%).

Protocol No.2:
Add at 0° C., diisopropylethylamine (6.30 mmol; 1.10 mL) to a hydroxy acid solution (6.30 mmol; 1.50 g) in anhydrous THF. Stir the reaction medium for 30 min at room temperature. Add at 0° C. the diphosgen (6.30 mmol; 0.76 mL) to the previous solution. Stir the reaction medium for 1 hr at 0° C. and then for 3 hrs at room temperature. Evaporate THF. Wash the obtained oil with (2×15 mL). Take up the oily residue in diethyl ether and remove the insoluble materials. Evaporate diethyl ether under reduced pressure in order to obtain an oil which crystallizes (0.99 g, 59%).

Protocol No.3:
Add at 0° C. the diphosgen (3.0 mmol, 0.36 mL) to a dicyclohexylamine salt of the hydroxy acid (3.0 mmol, 1.26 g) and of diisopropylethylamine grafted on polystyrene (1.0 g, 3.0 mmol) in 20 mL of anhydrous diethyl ether. Stir the reaction medium for 4 h at room temperature. Filter the resin, rinse with 15 mL of anhydrous diethyl ether. Collect the etherated phases and then evaporate the solvent. Wash the obtained oil with pentane (2×10 mL). Dry the product under reduced pressure in order to obtain an oil which crystallizes in the freezer (0.53 g, 67%).

$^1$H NMR (CDCl$_3$-200 MHz): 2.44-2.22 (m, 2H); 2.63 (t, 2H, J$_{HH}$=6.7 Hz); 5.14
2H); 5.21 (dd, 1H, J$_{HH}$=7.8 and 5.4 Hz); 7.36 (m, 5H).
$^{13}$C NMR (CDCl$_3$-75 MHz): 26.0; 28.3; 67.1; 78.0; 128.2-128.7; 135.2; 147.9; 166.6; 171.2.

Melting point: 59-60° C. IR(KBr): 1,891; 1,805; 1,740
MS (IE): 264; 236; 210; 174; 108; 91; 65. (M=264.23)

EXAMPLE 12

Polymerization of BnGlu-OCA Obtained in Example 10 Homopolymerization:

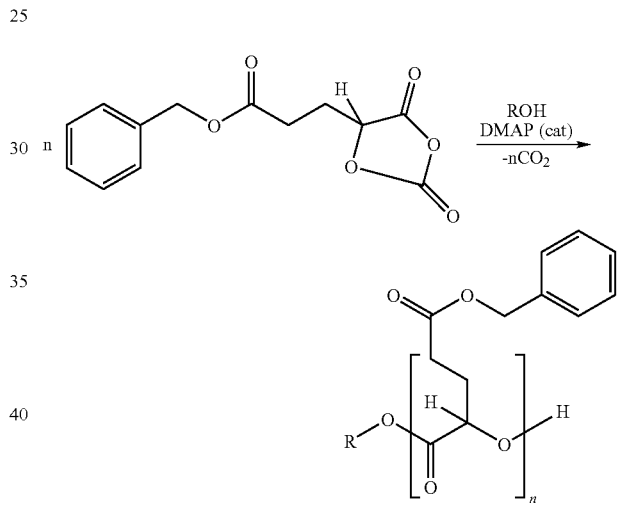

poly(BnGlu)$_{20}$
In a schlenk tube dried beforehand in vacuo, put the BnGlu-OCA obtained in Example 1 (1.58 mmol, 370 mg) in solution into 5 mL of DCM. While stirring, add at room temperature the n-pentanol (0.079 mmol, 9 µL) and then DMAP (0.079 mmol, 10 mg). After 5 min (end of CO$_2$ evolvement) total consumption of the monomer is confirmed by 1H NMR. Add 10 mL of DCM and wash the reaction medium twice with 10 mL of 2N HCl and 10 mL of brine. Dry on anhydrous sodium sulfate and evaporate to dryness in order to obtain a viscous oil (120 mg, 75%).

$^1$H NMR: 7.30 (m, Ar); 5.10 (m, CH$_2$Ar+C̲HOCO); 4.29 (dd, J$_{HH}$=4,2 Hz, J$_{HH}$=7.8HZ, C̲HOH̲); 4.04 (t, J$_{HH}$=6.8 Hz, OCH$_2$CH$_2$); 2.0-2.6 (m, CH$_2$CH$_2$CO$_2$ Bn); 1.50 (m, OCH$_2$ C̲H$_2$C̲H$_2$); 1.23 (m, C̲H$_2$C̲H$_2$C̲H$_3$); 0.83 (t, J$_{HH}$=6,8 Hz, C̲H$_2$CH$_2$CH$_3$). Incorporation of one n-pentanol unit for 20 glutamic units.
GPC: Mn=2,700; Mw=3,380; IP=1.25 poly(BnGlu)$_{50}$
In a schlenk tube dried beforehand in vacuo, put the BnGlu-OCA obtained in Example 1 (1.05 mmol, 277 mg) in solution in 4 mL of DCM. While stirring, add at room temperature a 0.05M solution of neopentyl alcohol in DCM (21 µmol, 140 µL) and then a 0.066M DMAP solution in DCM (21 µmol, 140 µL). After 15 min (end of $CO_2$ evolvement), total consumption of the monomer is confirmed by $^1H$ NMR. Add 5 mL of DCM and wash the reaction medium twice with 10 mL of 2N HCl and 10 mL of brine. Dry on anhydrous sodium sulfate and evaporate to dryness in order to obtain viscous oil (210 mg, 91%).

$^1H$ NMR: 7.30 (m, Ar); 5.10 (m, $CH_2Ar$+$\underline{CH}OCO$); 3.82 (s, $OCH_2tBu$); 2.0—2.6 (m, $CH_2CH_2\overline{CO}_2Bn$); 0.90 (s, $OCH_2tBu$). Incorporation of one alcohol unit for 50 glutamic units.

GPC: Mn=6,290; Mw=7,440; IP=1.18 poly(Glu)$_{10}$OAc

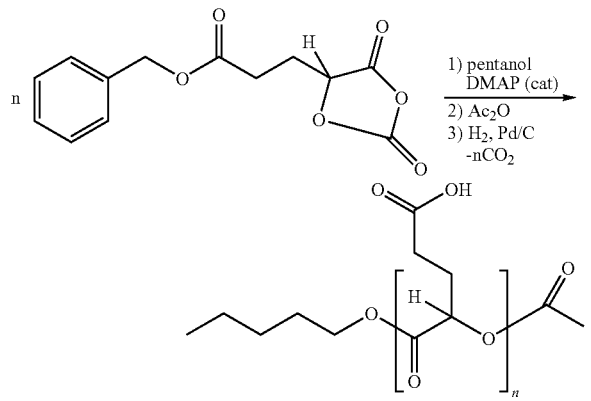

1) Polymerization

In a schlenk tube dry beforehand in vacuo, put the BnGlu-OCA obtained in Example 1 (0.81 mmol, 215 mg) in solution into 5 mL of DCM. While stirring, add at room temperature the n-pentanol (0.08 mmol, 9 µL) and then DMAP (0.08 mmol, 10 mg). After 5 min (end of $CO_2$ evolvement) total consumption of the monomer is confirmed by $^1H$ NMR.

$^1H$ NMR: 7.30 (m, Ar); 5.10 (m, $CH_2Ar$+$\underline{CH}OCO$); 4.30 (dd, $J_{HH}$=4,2 Hz, $J_{H'H'}$=7.8 Hz, $\underline{CH}OH$); 4.05 (m, $OCH_2CH_2$); 2.10-2.50 (m, $CH_2CH_2CO_2Bn$); 1.60 (m, $OCH_2\overline{CH}_2CH_2$); 1.30 (m, $CH_2\overline{CH}_2\overline{CH}_3$); 0.88 (t, $J_{HH}$=6.8 Hz, $CH_2\overline{CH}_2CH_3$). Incorporation oone n-pentanol unit for 9 glutamic units.

GPC: Mn=2,060; Mw=2,560; IP=1.24

2) Protection of Terminal Alcohol Functions

Add to the reaction medium 2 equivalents of acetic anhydride (0.16 mmol, 16 µL) and stir at room temperature for 1 hour. The $^1H$ NMR spectrum confirms total protection of the terminal alcohol functions (disappearance of the $\underline{CH}OH$ signal). Wash the reaction medium twice with 5 mL of 2N HCl and then 5 mL of brine. Dry on anhydrous sodium sulfate and evaporate to dryness (after co-evaporation with toluene) in order to obtain a viscous oil.

$^1H$ NMR: 7.30 (m, Ar); 5.10 (m, $CH_2Ar$+$\underline{CH}OCO$); 4.10 (m, $OCH_2CH_2$); 2.05—2.50 (m, $CH_2CH_2CO_2Bn$); 2.06 (s, $OCO\underline{CH}_3$); 1.60 (m, $OCH_2\overline{CH}_2CH_2$); 1.30 (m, $CH_2\overline{CH}_2CH_3$); 0.86 (t, $J_{HH}$=6.8 Hz, $CH_2CH_2CH_3$). Disappearance of the $\underline{CH}OH$ signal and incorporation of the acyl unit, a singlet at 2.06 ppm.

GPC: Mn=1,960; Mw=2,430; IP=1.24

3) Deprotection of Carboxylic Acid Funtions

Hydrogenolyze the acetylated copolymer in solution in 25 mL of ethyl acetate under a hydrogen atmosphere in the presence of 10% Pd/C (10 mg) and at atmospheric pressure for 1 hour. Filter on celite, rinse with ethyl acetate and evaporate the solvent. Take up with THF and evaporate to dryness. Triturate the polymer in chloroform, remove the chloroform and evaporate to dryness in order to obtain white <<foam>>.

$^1H$ NMR: 5.00-5.30 (m, $\underline{CH}OCO$); 4.02 (m, $OCH_2CH_2$); 1.90-2.50 (m, $CH_2CH_2CO_2H$); 2.05 (s, $OCOCH_3$); 1.55 (m, $OCH_2\overline{CH}_2CH_2$); 1.22 (m, $CH_2\overline{CH}_2CH_2$); 1.22 (m, $CH_2\overline{CH}_2CH_3$); 0.77 (t, $J_{HH}$=6.8 Hz, $CH_2CH_2CH_3$). Total debenzylation.

GPC: Mn=1,860; Mw=2,230; IP=1.19 lac-OCA/BnGlu-OCA Random Copolymerization:

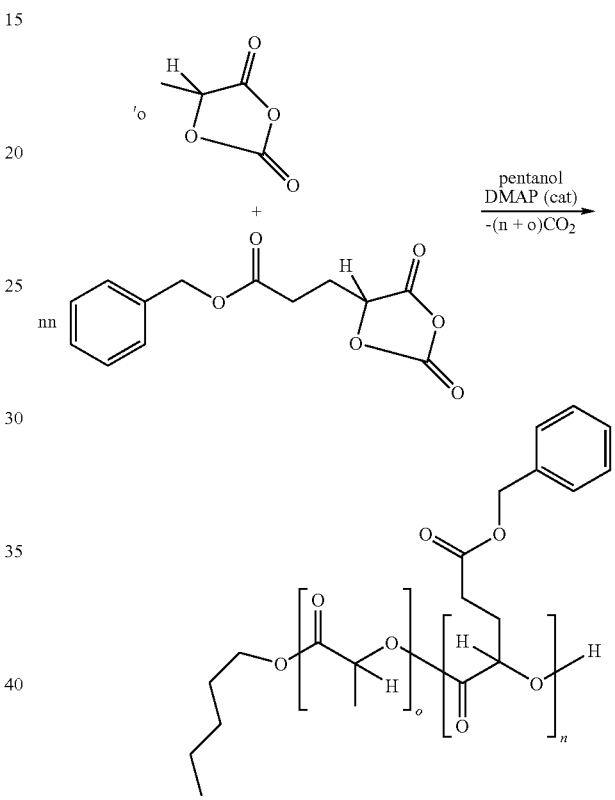

poly(Lac)$_{10}$poly(BnGlu)$_{10}$

In a schlenk tube dried beforehand in vacuo, put the BnGlu-OCA obtained in Example 1 (0.95 mmol, 250 mg and Lac-OCA (0.95 mmol, 110 mg) in solution in 3 mL of DCM. While stirring, add at room temperature the n-pentanol (0.095 mmol, 10 µL) and then DMAP (0.095 mmol, 12 mg). After 5 min (end of $CO_2$ evolvement) total consumption of both monomers is confirmed by $^1H$ NMR. Further add 5 mL of DCM and then wash the reaction medium twice with 5 mL of 2N HCl and 5 mL of brine. Dry on anhydrous sodium sulfate and evaporate to dryness in order to obtain a viscous oil (250 mg, 87%).

$^1H$ NMR: 7.30 (m, Ar); 5.07 (m, $CH_2Ar$+$\underline{CH}OCO$); 4.30 (m, $\underline{CH}OH$); 4.05 (m, $OCH_2\overline{CH}_2$); 2.10-2,50 (m, $CH_2CH_2CO_2Bn$); 1.53 (m, $CH_3CH$+$OCH_2CH_2CH_2$); 1.23 (m, $CH_2\overline{CH}_2CH_3$); 0.80 (t, $J_{HH}$=6.8 Hz, $CH_2CH_2CH_3$). Incorporation of one n-pentanol unit for 10 glutamic units and 10 lactic units.

GPC: Mn=2,800; Mw=3,860; IP=1.38 poly(Lac)$_{10}$poly(BnGlu)$_1$

In a schlenk tube dried beforehand in vacuo, put the BnGlu-OCA obtained in Example 1 (0.12 mmol, 32 mg) and the Lac-OCA (1.20 mmol, 140 mg) in 5 mL of DCM. While stirring, add at room temperature, the n-pentanol (0.12 mmol, 12 µL) and then DMAP (0.12 mmol, 14 mg). After 5 min (end of CO$_2$ evolvement) total consumption of both monomers is confirmed by $^1$H NMR. Wash the reaction medium twice with 5 mL of 2N HCl and 5 mL of brine. Dry on anhydrous sodium sulfate and evaporate to dryness in order to obtain viscous oil (90 mg, 81%).

$^1$H NMR: 7.30 (m, Ar); 5.10 (m, CH$_2$Ar+C$\underline{H}$OCO); 4.30 (m, C$\underline{H}$OH); 4.05 (m, OCH$_2$C$\underline{H}_2$); 2.10-2.50 (m, CH$_2$CH$_2$CO$_2$Bn); 1.50 (m, C$\underline{H}_3$CH+OCH$_2$C$\underline{H}_2$CH$_2$); 1.20 (m, C$\underline{H}_2$CH$_2$CH$_3$); 0.80 (t, J$_{HH}$=6.8 HZ, CH$_2$CH$_2$C$\underline{H}_3$). Incorporation of one pentanol unit for 1 glutamic unit and 10 lactic units.

GPC: Mn=1,125; Mw=1,550; IP=1.38 poly(Lac)$_{10}$poly(Glu)$_2$OAc

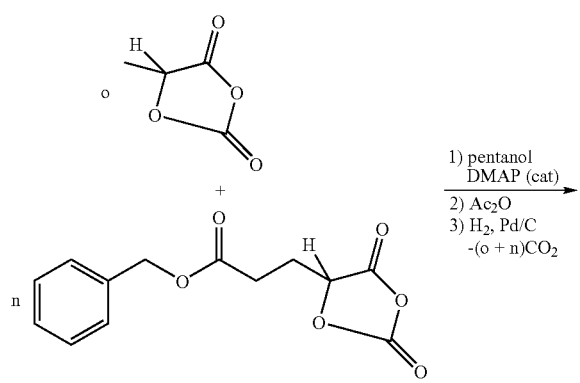

1) Polymerization

In a schlenk tube dried beforehand in vacuo, put the BnGlu-OCA obtained in Example 1 (0.45 mmol, 119 mg) and the Lac-OCA (2.33 mmol, 270 mg) in solution in 10 mL of DCM. While stirring, add at room temperature the n-pentanol (0.23 mmol, 26 µL) and then DMAP (0.23 mmol, 28 mg). After 5 min (end of CO$_2$ evolvement) total consumption of the monomers is confirmed by $^1$H NMR.

$^1$H NMR: 7.30 (m, Ar); 5.10 (m, CH$_2$Ar+C$\underline{H}$OCO); 4.30 (m, C$\underline{H}$OH); 4.05 (m, OCH$_2$C$\underline{H}_2$); 2.10-2.50 (m, CH$_2$CH$_2$CO$_2$Bn); 1.50-1.20 (m, C$\underline{H}_3$CH+OCH$_2$CH$_2$CH$_2$, C$\underline{H}_2$CH$_2$CH$_3$); 0.80 (t, J$_{HH}$=6.8 HZ, CH$_2$CH$_2$C$\underline{H}_3$). Incorporation of one n-pentanol unit for 1.8 glutamic units and 10 lactic units.

GPC: Mn=1,560; Mw-2,070; IP=1.33

2) Protection of Terminal Alcohol Functions

Add to the reaction medium, 2 equivalents of acetic anhydride (0.46 mmol, 44 µL) and stir at room temperature for 1 hour. The $^1$H NMR spectrum confirms total protection of the terminal alcohol functions (disappearance of the C$\underline{H}$OH signal). Wash the reaction medium twice with 10 mL of 2N HCl and then with 5 mL of brine. Dry on anhydrous sodium sulfate and evaporate to dryness (after co-evaporation with toluene) in order to obtain a viscous oil (250 mg, 91%).

$^1$H NMR: 7.30 (m, Ar); 5.10 (m, CH$_2$Ar+C$\underline{H}$OCO); 4.05 (m, OCH$_2$CH$_2$); 2.05—2.50 (m, C$\underline{H}_2$CH$_2$CO$_2$Bn); 2.05 (s, OCOC$\underline{H}_3$); 1.50-1.20 (m, C$\underline{H}_3$C$\underline{H}$+OCH$_2$CH$_2$CH$_2$, CH$_2$C$\underline{H}_2$CH$_3$); 0.80 (t, J$_{HH}$=6.8 H$\underline{Z}$, CH$_2$CH$_2$C$\underline{H}_3$). Disappearance of the C$\underline{H}$OH signal and incorporation of one acetyl unit, singlet 2.05 ppm.

GPC: Mn=1,530; Mw=2,020; IP=1.32

3) Deprotection of Carboxylic Acid Functions

Hydrogenolyze the acetylated copolymer (220 mg) in a solution of 25 mL of ethyl acetate under a hydrogen atmosphere in the presence of 10% Pd/C (10 mg) and at atmospheric pressure for 1 hour. Filter on celite, rinse with ethyl acetate and evaporate the solvent. Take up with THF and evaporate to dryness in order to obtain white «foam» (190 mg).

$^1$H NMR: 5.10 (m, C$\underline{H}$OCO); 4.05 (m, OCH$_2$CH$_2$); 2.05-2.50 (m, CH$_2$CH$_2$CO$_2$H); 2.07 (s, OCOC$\underline{H}_3$); 1.50-1.20 (m, CH$_3$C$\underline{H}$+OC$\underline{H}_2$C$\underline{H}_2$C$\underline{H}_2$+C$\underline{H}_2$C$\underline{H}_2$CH$_3$); 0.80 (t, J$_{HH}$=6.8 Hz, CH$_2$CH$_2$C$\underline{H}_3$). Total debenzylation.

GPC: Mn=1,370; Mw=1,790; IP=1.30 lac-OCA/BnGlu-OCA Block Copolymerization:

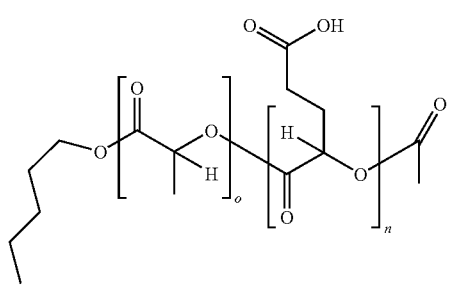

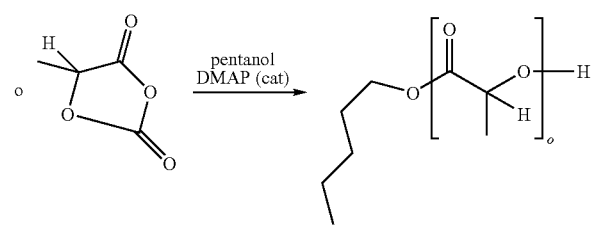

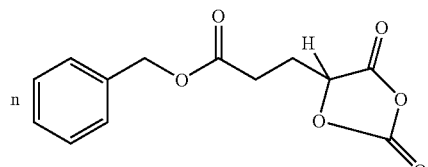

-continued

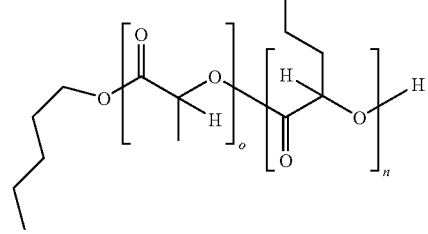

poly(Lac)$_{20}$poly(BnGlu)$_{10}$

In a schlenk tube dried beforehand in vacuo, put the Lac-OCA (1.77 mmol, 205 mg) in solution into 3 mL of DCM. While stirring, add at room temperature, the n-pentanol (0.088 mmol, 10 μL) and then DMAP (0.088 mmol, 10 mg). After 5 min (end of CO$_2$ evolement) total consumption of the monomer is confirmed by $^1$H NMR.

$^1$H NMR: 5.15 (m, CHOCO); 4.30 (m, CHOH); 4.10 (m, O CH$_2$CH$_2$); 1.50 (m, CH$_3$CH+OCH$_2$CH$_2$CH$_2$); 1.30 (m, CH$_2$CH$_2$CH$_3$); 0.90 (t, J$_{HH}$=6.8 Hz, CH$_2$CH$_2$CH$_3$). Incorporation of one n-pentanol unit for 20 lactic units.

GPC: Mn=1,440; Mw=1,780; IP=1.24

To the previous solution of poly(lac)$_{20}$ add a solution of BnGlu-OCA obtained in Example 1 in 2 mL of DCM. After 5 min (end of CO$_2$ evolement) total consumption of the monomer is again confirmed by $^1$H NMR. Disappearance of the CHOH signal at 4.30 ppm confirms that the poly(lac)$_{20}$ actually plays its role of macro-initiator. Wash the reaction medium twice with 10 mL of 2N HCl and 10 mL of brine. Dry on anhydrous sodium sulfate and evaporate to dryness in order to obtain a white foam (330 mg, 88%).

$^1$H NMR: 7.30 (m, Ar); 5.10 (m, CH$_2$Ar+CHOCO); 4.30 (m, CHOH); 4.10 (m, OCH$_2$CH$_2$); 2.10-2.50 (m, CH$_2$CH$_2$CO$_2$Bn); 1.50 (m, CH$_3$CH+OCH$_2$CH$_2$CH$_2$); 1.30 (m, CH$_2$CH$_2$CH$_3$); 0.90 (t, J$_{HH}$=6.8 Hz, CH$_2$CH$_2$CH$_3$). Incorporation of the terminal alcohol of poly(Lac)$_{20}$ in the poly(BnGlu) chain. Presence of one n-pentanol unit for 10 glutamic units and 20 lactic units.

GPC: Mn=2,540; Mw=3,120; IP=1.23

EXAMPLE 13

Synthesis of OCA-BnSerine

Dinitration of L-Bn-serine (Deechongkit, S. et al., *Org. Lett* 2004, 6, 497-500)

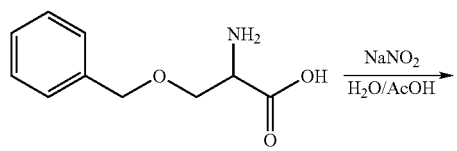

-continued

Add within 30 min and at 0° C., 20 mL of an aqueous 2M NaNO$_2$ solution (40.0 mmol) to a suspension of BnSerine (3.2 g; 20. mmol) in 200 mL of a H$_2$O/AcOH 8/2 mixture. The reaction medium is homogenous after 1 hour at 0° C. Stir for 5 hours at room temperature in order to complete the reaction (TLC check: DCM 90—MeOH 9—AcOH 1). Add 250 mL of water and extract with AcOEt (4×100 mL). Pool the organic phases and wash them with brine and then dry them on sodium sulfate. Evaporate the solvent in order to obtain 3.85 g of oil. Purify with chromatography (DCM 95—MeOH 4.5—AcOH 0.5). Recover an oil which crystallizes (3.15 g; 82%).

$^1$H NMR (CDCl$_3$-300 MHz): 3.80 (m, 2H); 4.41 (m, 1H); 4.57 (d, 1H, J$_{HH}$=12.3 Hz); 4.62 (d,1H, J$_{HH}$=12.3 Hz); 7.33 (m, 5H) $^{13}$C NMR (CDCl$_3$-75 MHz): 70.4; 71.0; 73,6; 127.9-128.5; 137.2; 176.2.

Melting point: 55-56° C.

Synthesis of OCA BnSerine:

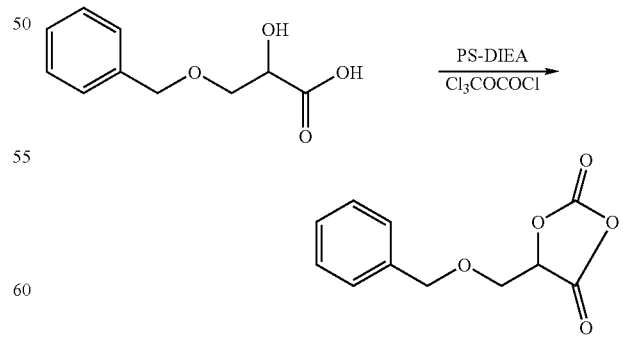

Add to a hydroxy acid solution (240 mg; 1.22 mmol) in 5 mL of anhydrous THF, the supported diisopropylethylamine (400 mg; 1.22 mmol). Add at 0° C. the diphosgene (1.22 mmol; 0.15 mL) and stir the reaction medium at room temperature for 4 hours. Filter and rinse the resin and then evaporate THF. Wash the residue with pentane (2×5 mL) and evaporate to dryness in order to obtain a colourless oil (240 mg; 88%).

$^1$H NMR (CDCl$_3$-300 MHz): 3.84 (m, 2H); 4.49 (d, 1H, $J_{HH}$=12.1 Hz); 4.54 (d, 1H, $J_{HH}$=12.1 Hz); 5.03 (m, 1H); 7.17-7.31 (m, 5H).

$^{13}$C NMR(CDCl$_3$-75 MHz): 66.1; 73.8; 79.6; 127.7; 128.3; 128.7; 136.2; 148.4; 165.5.

Melting point: 63-64° C.

IR (cm$^{-1}$;CCl$_4$): 1,905; 1,815.

MS (DCl, CH$_4$): 222; 198; 181; 131; 119; 107. (M=222.19)

EXAMPLE 14

Synthesis of OCA-CbzLysine

Dinitration of L-Cbzlysine (Deechongkit, S. et al., *Org. Lett.* 2004, 6, 497-500; Shin, I, et al. *J. Org. Chem.* 2000, 65, 7667-7675).

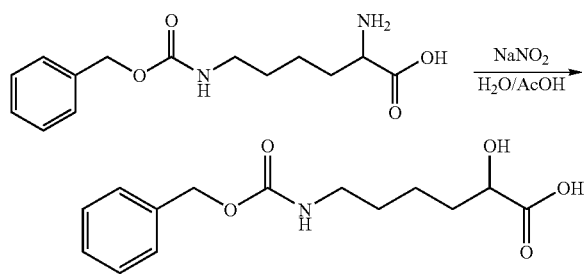

Add within 30 min, 400 mL of 2M NaNO$_2$ solution (5.0 g; 70.0 mmol) to a suspension of L-CBzLysine (10.0 g; 35.7 mmol, Bachem) in 200 mL of a H$_2$O/AcOH 1/1 mixture cooled on an ice bath. The reaction medium is stirred at room temperature for 18 hours and is then homogenous.

Add 200 mL of water and extract with ethyl acetate (3×150 mL). Collect the organic phases and wash them with brine (3×100 mL). Dry on sodium sulfate. Evaporate the solvents and then take up the oily residue in toluene in order to remove a maximum of acetic acid.

Evaporate to dryness in order to obtain 11.5 g of yellow oil (the O-acetylated derivative in majority).

Perform diacetylation in 100 mL of a MeOH-H$_2$O 1/1 mixture in the presence of 6.0 g of potassium carbonate.(pH 9-10). Reaction is completed after 3 hrs 30 mins. Add 50 mL of water and evaporate the methanol. Extract the aqueous phase with 100 mL of ethyl acetate. Acidify the aqueous phase (pH 2) and extract with ethyl acetate (2×100 mL). Wash with brine and dry on sodium sulfate. Evaporate in order to obtain 8.70 g of a sticky whitish powder. Triturate in 100 mL of pentane. Remove the solvent in order to obtain a white powder (7.22 g; 72%).

$^1$H NMR (CDCl$_3$-300 MHz): 1.51 (m, 4H), 1.72-1.76 (m, 2H), 3.18 (m, 2H), 4.25 (m, 1H), 5.11 (s, 2H), 7.34 (m, 5H).

$^{13}$C NMR (CDCl3-75 MHz): 21.9; 29.3; 33.5; 40.9; 66.9; 70.1; 128.0-128.5; 136.4; 158.0; 177.7.

Melting point: 74-76° C. (bed 79-81° C.).

Synthesis of OCA-CbzLysine:

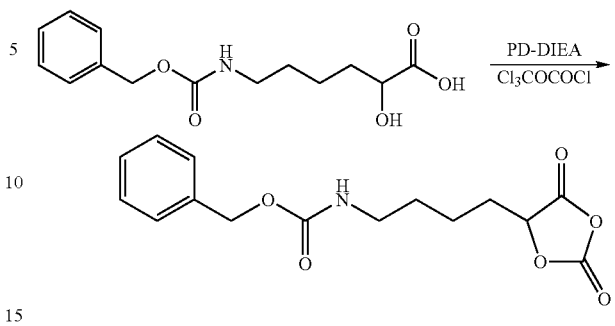

Add to a hydroxyacid solution (160 mg; 0.57 mmol) in 3 mL of anhydrous THF, the supported diisopropylethylamine (380 mg; 1.14 mmol). Add at 0° C. the diphosgene (0.57 mmol; 70 μL) and stir the reaction medium at room temperature for 1 hour. Filter and rinse the resin and then evaporate the THF. Wash the residue with pentane (2×5 mL) and evaporate to dryness to obtain a colourless oil (160 mg; 91%).

$^1$H NMR (CDCl$_3$-300 MHz): 1.55 (m, 4H); 2.10 (m, 2H); 3.22 (m, 2H); 4.80 (m, 1H); 4.95 (m,1H), 5.10 (s, 2H); 7.35 (m, 5H).

$^{13}$C NMR (CDCl3-75 MHz): 21.3; 29.1; 30.3; 40.3; 66.7; 79.6; 128.1; 128.2; 128.6; 136.6;
148.3; 156.6; 167.1.

Melting point: 57-58° C.

IR (cm$^{-1}$; CCl$_4$): 1,896; 1,812; 1,718.

MS (DCl, CH$_4$): 354; 325; 308; 290; 264; 218; 192; 174; 156; 119. (M=307.29)

The invention claimed is:

1. A method for preparing poly(α-hydroxy acids) comprising the following successive steps:
    i) controlled polymerization of OCA monomers of formula (I) in an anhydrous organic solvent at a temperature in a range of from −20 to 200° C.,

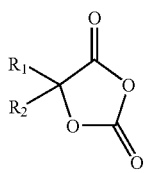

wherein R$_1$ and R$_2$ either identical or different, independently of each other, represent a radical selected from the group formed by
    hydrogen,
    C$_1$-C$_{12}$ alkyl radicals
    C$_7$-C$_{20}$ aralkyl radicals,
    C$_3$-C$_{14}$ cycloalkyl radicals,
    C$_2$-C$_{14}$ heterocycloalkyl radicals,
    C$_6$-C$_{14}$ aromatic radicals, and
    C$_3$-C$_{14}$ heteroaromatic radicals, or
R$_1$ and R$_2$ form together a radical selected from the group consisting of C$_4$-C$_{14}$ cycle and fused C$_3$-C$_{14}$ heterocycle,
    iii) recovery of the obtained polymer following step i),
wherein the polymerization reaction of step i) is performed in a controlled manner in presence of a catalytic system comprising a base, said base being a 5- or 6-membered aromatic heterocycle comprising at least one endocyclic nitrogen atom, with the proviso that when the base is used alone in the catalytic system, it does not represent pyridine, 2-methylpyridine, 2,6-dimethylpyridine, or 2-methoxy-pyridine.

2. The method of claim 1, wherein the radical is substituted with one or more substituting radicals selected from the group consisting of halogens, —NO$_2$, —OH, —NH$_2$, —SH, —COOH, —NH—NH$_2$, and —NH—C(NH)—NH$_2$.

3. The method of claim 2, wherein the substituting radicals are protected.

4. The method of claim 1, wherein the reaction temperature is in a range of from 0 to 100° C.

5. The method of claim 4, wherein the reaction temperature is in a range of from 20 to 50° C.

6. The method of claim 1, further comprising before step iii), a step ii) of purification of the obtained polymer following step i).

7. The method according to claim 1, wherein R$_1$ and R$_2$ represent independently of each other, a radical selected from the group consisting of hydrogen, methyl and phenyl.

8. The method according to claim 1, wherein at least one radical R$_1$ or R$_2$ represents a radical (B)$_u$-A-(CH$_2$)$_t$ wherein
t is an integer between 1 and 10;
A represents a heteroatom selected from the group consisting of O, N and S and a —COO and —NH radical,
B represents a A-protective group;
u is 1 or 2.

9. The method according to claim 1, wherein said base is a 5- or 6- membered aromatic heterocycle comprising at least one endocyclic nitrogen atom conjugate with another endocyclic or exocyclic nitrogen atom.

10. The method according to claim 9, wherein said base is an amino-pyridine of formula (II)

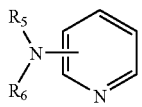

(II)

wherein R$_5$ and R$_6$ represent independently of each other, a C$_1$-C$_6$ alkyl radical, or R$_5$ and R$_6$ form together a 5- or 6-membered heterocycloalkyl, the —NR$_5$R$_6$ group being in position 2 or 4.

11. The method according to claim 9, wherein said base is 4-dimethylamino pyridine.

12. The method according to claim 9, wherein said base is an imidazole of formula (III)

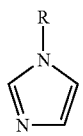

(III)

wherein R represents a C$_1$-C$_6$ alkyl radical.

13. The method according to claim 12, wherein said base is N-methyl-imidazole.

14. The method according to claim 1, wherein the catalytic system further comprises a protic reagent.

15. The method according to claim 11, wherein the catalytic system further comprises a protic reagent.

16. The method according to claim 13, wherein the catalytic system further comprises a protic reagent.

17. The method according to claim 14, wherein the protic reagent is selected from the group consisting of water, alcohols, primary and secondary amines, thiols and polymers with alcohol, amino and thiol functionalities.

18. The method according to claim 17, wherein the protic reagent is selected from the group consisting of water, aliphatic C$_1$-C$_{12}$ alcohols, poly(glycolic acids), poly(lactic acids) and their copolymers.

19. The method according to claim 15, wherein the protic reagent is selected from the group consisting of water, aliphatic C$_1$-C$_{12}$ alcohols, poly(glycolic acids), poly(lactic acids) and their copolymers.

20. The method according to claim 16, wherein the protic reagent is selected from the group consisting of water, aliphatic C$_1$-C$_{12}$ alcohols, poly(glycolic acids), poly(lactic acids) and their copolymers.

21. The method according to claim 1, wherein, during step i), the organic solvent is selected from the group consisting of chlorinated aliphatic solvents, ethers, cyclic ethers and aromatics.

22. A poly(α-hydroxy acid) of formula (VI)

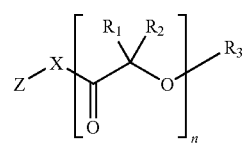

(VI)

wherein
R$_1$ and R$_2$ either identical or different, independently of each other, represent a radical selected from the group consisting of
hydrogen.
C1-C12 alkyl radicals
C7-C20 aralkyl radicals,
C3-C14 cycloalkyl radicals,
C2-C14 heterocycloalkyl radicals.
C6-C14 aromatic radicals, and
C3-C14 heteroaromatic radicals,
or R$_1$ and R$_2$ form together a radical selected from the group consisting of C4-C14 cycle and fused C3-C14 heterocycle;
X represents a heteroatom selected from the group consisting of O, N and S, and Z represents a C$_1$-C$_{12}$ alkyl radical; or
-X-Z represents a polymer selected from the group consisting of poly(glycolic acids), poly(lactic acids), and their copolymers, said polymers being terminated by a radical -X'-Z' wherein X' represents a heteroatom selected from the group consisting of O, N and S, and Z' represents a C$_1$-C$_2$ alkyl radical;
R$_3$ represents a O-protective group or a hydrogen atom n is larger than or equal to 1.

23. The poly(α-hydroxy acid) according to claim 22, wherein n is between 1 and 500.

24. The poly(α-hydroxy acid) according to claim 22, wherein n is between 15 and 350.

25. The poly(α-hydroxy acid) according to claim 22, wherein in formula (VI), X represents the O heteroatom and Z represents a C$_1$-C$_6$ alkyl radical.

26. The poly(α-hydroxy acid) according to claim 22 wherein in formula (VI), -X-Z represents a radical of formula (VII)

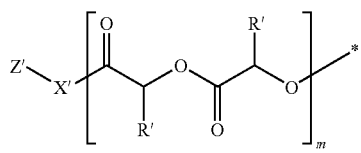

(VII)

wherein R' represents H or CH$_3$,
X' represents a heteroatom selected from the group consisting of O, N and S, and Z' represents a C$_1$-C$_{12}$ alkyl radical.

27. The poly(α-hydroxy acid) according to claim 26, wherein in formula (VII), X' represents the O heteroatom and Z' represents a C$_1$-C$_6$ alkyl radical.

28. The poly(α-hydroxy acid) according to claim 22, wherein, in formula (VI), R$_1$ represents a radical —(CH$_2$)$_2$-R$_4$ wherein t is an integer between 1 and 10 and R$_4$ represents A-(B)u or -A-H group, in which
A represents a heteroatom selected from the group consisting of O, N and S and a —COO and —NH radical,
B represents a group protecting A, B being different from R$_3$,
u is 1 or 2.

29. OCA of formula IV:

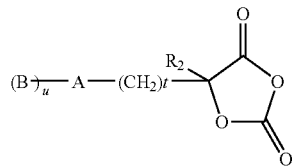

(IV)

wherein
t is an integer between 1 and 10;
A represents a heteroatom selected from the group consisting of O, N and S and a —COO and —NH radical,
B represents a group protecting A;
u is 1 or 2
R$_2$ represents a radical selected from the group consisting of
hydrogen,
(CH$_2$)t-A-(B)u wherein
t is an integer between 1 and 10,
u is 1 or 2,
A represents a heteroatom selected from the group consisting of O, N and S and a —COO and —NH radical,
B represents a group protecting A;
C$_1$-C$_{12}$ alkyls,
C$_7$-C$_{20}$ aralkyls,
C$_3$-C$_{14}$ cycloalkyls,
C$_2$-C$_{14}$ heterocycloalkyls,
aromatic C$_6$-C$_{14}$ radicals, and
heteroaromatic C$_3$-C$_{14}$ radicals,
and their addition salts, their isomers, enantiomers, diastereoisomers and their mixtures.

30. The OCA of claim 29, wherein B represents a benzyloxycarbonyl and A represents NH.

31. The OCA of claim 29, wherein B represents a benzyl and A represents O or a —COO group.

* * * * *

UNITED STATES PATENT AND TRADEMARK OFFICE
CERTIFICATE OF CORRECTION

PATENT NO. : 7,528,211 B2 Page 1 of 1
APPLICATION NO. : 11/783258
DATED : May 5, 2009
INVENTOR(S) : Didier Bourissou et al.

It is certified that error appears in the above-identified patent and that said Letters Patent is hereby corrected as shown below:

Column 10, line 33, please replace "$(CH_2)$ t-A-B)" with -- $(CH_2)$ t-A-(B) --.

Column 16, line 62, please replace "7.5 pl" with -- 7.5µl --.

Column 27, lines 21-22, please replace "4.31 (dd, 1H, $J_{HH}$=7.6" and "2.6 (m, 2H); 2.0-2.3 (m, 2H)" with -- 4.31 (dd, 1H, $J_{HH}$=7.6 and 3.09 Hz); 2.6 (m, 2H); 2.0-2.3 (m, 2H). --.

Claim 22, Column 38, line 23, please replace "A poly (ct-hydroxy acid)" with -- A poly(α-hydroxy acid) --.

Claim 28, Column 39, line 19, please replace "- $(CH_2)_2$" with -- $(CH_2)_t$ --.

Signed and Sealed this

Twenty-third Day of November, 2010

David J. Kappos
*Director of the United States Patent and Trademark Office*